(12) United States Patent
Jordan et al.

(10) Patent No.: US 8,369,525 B2
(45) Date of Patent: *Feb. 5, 2013

(54) DYNAMIC PASSWORD UPDATE FOR WIRELESS ENCRYPTION SYSTEM

(75) Inventors: Royce D. Jordan, Lawrenceville, GA (US); Brett T. Williams, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 2640 days.

This patent is subject to a terminal disclaimer.

(21) Appl. No.: 10/279,346

(22) Filed: Oct. 24, 2002

(65) Prior Publication Data
US 2004/0083393 A1   Apr. 29, 2004

(51) Int. Cl.
*H04L 29/06*   (2006.01)
(52) U.S. Cl. .......................... 380/273; 713/168; 713/171
(58) Field of Classification Search .................. None
See application file for complete search history.

(56) References Cited

U.S. PATENT DOCUMENTS

| 5,761,306 | A  | * | 6/1998 | Lewis ........................... 380/282 |
| 6,026,165 | A  | * | 2/2000 | Marino et al. ................. 380/273 |
| 6,292,096 | B1 | * | 9/2001 | Munch et al. ................. 340/445 |
| 7,024,553 | B1 | * | 4/2006 | Morimoto ..................... 713/163 |
| 2003/0221098 | A1 | * | 11/2003 | Chen et al. ..................... 713/153 |

* cited by examiner

*Primary Examiner* — Benjamin Lanier
(74) *Attorney, Agent, or Firm* — Parks IP Law LLC; Mickki D. Murray, Esq.

(57) ABSTRACT

A method and system for dynamically changing password-keys in a secured wireless communication system includes initiating a password key change, generating a new password key, embedding the new password key and a password key indicator in a first message, encrypting the first message using an old password key, storing the new password key, sending the formatted encrypted first message over a wireless communication system, receiving a subsequent second message, and decrypting the subsequent second message using the new password key.

36 Claims, 15 Drawing Sheets

DYNAMIC PASSWORD UPDATE FOR WIRELESS ENCRYPTION SYSTEM

DESCRIPTION OF THE INVENTION

1. Field of the Invention

The present invention relates generally to a system and method for encrypting messages transmitted over a wireless communications system. More particularly, the present invention relates to a system and method for dynamically changing a password by embedding it in an encrypted message that is transmitted over a wireless communication system.

2. Background of the Invention

Security is often a concern in a wireless communication system. Typically, messages transmitted in a wireless system are not subject to any security considerations. For example, when a message is sent to a pager over a wireless system, the message is formatted by the network side of the system and then transmitted via a radio tower to the pager. The protocols in which a message is typically formatted are generally well known. For example, in a Mobitex network, an HP 98 protocol may be used. This HP 98 protocol, which is commonly used with the RIM Blackberry device, acts to format a message for transmission over the air. Messages formatted in such a manner may be intercepted and decoded using these known protocols. Therefore, anyone in possession of a radio receiver and knowledge of these protocols can intercept wireless messages and decode them.

In response to increasing concerns over security, some wireless providers have implemented various security procedures. In one common procedure, a single password key provides the basis for all security. In this manner, a password key is associated with a device by equipment on the wireless network. For example, a pager or a cellular phone may have a single password key that is stored in its non-volatile memory. Likewise, a piece of equipment, such as an interactive message gateway, typically stores information about the wireless device along with its password key. This password key is typically loaded onto the wireless device and the interactive message gateway at some initial point in time. The wireless device and the network side of the wireless communication system then communicate over time using this single password key. For example, a message sent from a wireless device over a communications network is first encrypted using the single password key. After the device encrypts the message, the message is transmitted over the wireless communication system. The network side of the wireless communication system receives this encrypted message and decrypts it using the single password key.

Many common encryption techniques are used in conjunction with the single password key procedure. One of the most common is the data encryption standard ("DES") or the triple DES encryption method. Unfortunately, the DES method is easy to break with today's rapidly advancing technology. Currently, a message encrypted using DES can be cracked in a matter of hours with the appropriate computer equipment. Further, use of a single password key continuously over a period of time does not provide an adequate level of security. If the password key is discovered, then all subsequent messages can be easily decoded.

In response to the problems associated with a single password key method, RIM, and its familiar Blackberry device, allows a user to change the password key every time the device is docked. In this manner, every time the wireless device is docked, the computer to which it is connected downloads a new password key. This new password key is then used for all wireless communications until the wireless device is docked again. In this manner, a single password key is utilized to secure wireless transmissions for the periods of time between which the wireless device is docked with a computer.

This approach has many disadvantages. First, this approach requires a user to physically dock a wireless device every so often in order to maintain security. If a user fails to dock the wireless device on a frequent and regular basis, then the single password key used to secure wireless transmissions may be discovered and subsequent wireless transmissions may be decoded. Moreover, it is inconvenient to physically dock a wireless device on a regular basis.

Increasingly, it is desirable to maintain secure wireless transmissions in a wireless communication system. It would be desirable to dynamically change the password key that a wireless device uses in its encryption method. The more often the password key is changed, the more secure wireless communications become.

Embodiments of the present invention are directed at overcoming one or more of the above issues.

SUMMARY OF THE INVENTION

In accordance with the invention, a method of dynamically changing password keys in a secured wireless communications system includes generating a new password key, embedding the new password key and a password key indicator in a first message, encrypting the first message using an old password key, storing the new password key, and sending the formatted encrypted first message over a wireless communications system.

In one aspect of the current invention, a method of dynamically changing password keys in a secured wireless communications system includes receiving an encrypted first message from a wireless transmission, decrypting the encrypted first message with an old password key, searching the decrypted first message for a new password key, and replacing the old password key with the new password key In another aspect consistent with the principles of the present invention, a method of dynamically changing password keys in a secured wireless communications system includes receiving an encrypted first message from a wireless transmission, decrypting the encrypted first message with an old receive password key, searching the decrypted first message for a new password key, replacing the old receive password key with the new password key, if the new password key is a new receive password key and replacing an old transmit password key with the new password key, if the new password key is a new transmit password key.

In yet another aspect consistent with the principles of the present invention, a method of dynamically changing password keys in a secured wireless communications system includes generating a new password key, embedding the new password key and a password key indicator in a first message, encrypting the first message using an old transmit password key, replacing the old transmit password key with the new password key, if the new password key is a new transmit password key, replacing an old receive password key with the new password key, if the new password key is a new receive password key, and sending the formatted encrypted first message over a wireless communications system.

In a further aspect of the present invention, A password protected communications apparatus includes an element for generating an updated password key, an operating system for embedding the updated password key and an updated password key identifier in a first message and encrypting the first message using an old password key, and memory for storing the updated password key, an initial password key, and communications information, the initial password key and the updated password key associated with the communications information.

In yet another embodiment consistent with the principles of the present invention, a password protected communications apparatus includes an operating system for receiving an encrypted first message from a wireless transmission, decrypting the encrypted first message with an old password key, and searching the decrypted first message for a new password key; and memory for storing the new password key, an initial password key, and communications information, the initial password key and the new password key associated with the communications information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Consistent with the general principles of the present invention, a system and method for dynamically changing a password key in a wireless communication system is provided. In this system and method, messages may be used as a vehicle to carry a new password key. Messages sent between wireless devices and the network side of the wireless communication system contain password keys that are used to improve security. In this manner, password keys are routinely changed when messages are sent and received.

Figure 1:
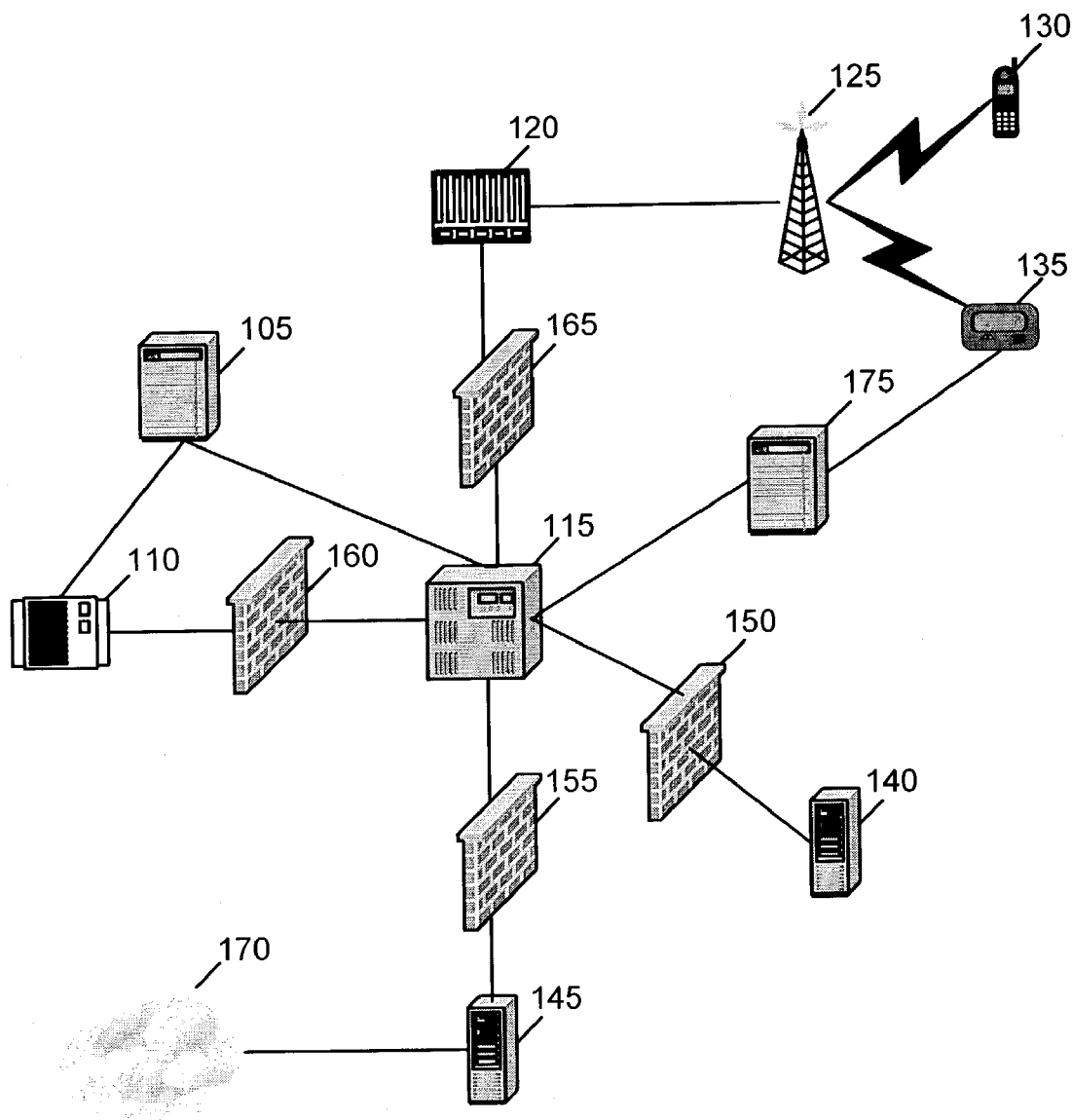
FIG. 1 is a diagram of a secured wireless communication system consistent with the principles of the present invention.

FIG. 1 depicts a wireless communication system consistent with the principles of the present invention. As herein embodied and illustrated in the exemplary embodiment of FIG. 1, a password protected wireless communication system may include a password generator 105, a database 110, a messaging gateway 115, a network element 120, a communications tower 125, wireless devices 130 and 135, an Internet server 145, an e-mail server 140, and numerous firewalls 150, 155, 160, and 165.

In the exemplary embodiment of FIG. 1, password generator 105 is interconnected to database 110 and messaging gateway 115. Database 110 is interconnected to messaging gateway 115. Messaging gateway 115 is connected to network elements 120, e-mail server 140, and Internet server 145. Internet server 145 is connected to the Internet 170. Network elements 120 are connected to communications tower 125. Communications tower 125, via radio waves, interacts with wireless devices 130 and 135. Further, firewalls 150, 155, 160 and 165 may be interspersed throughout wireless communication system 100. For example, firewall 150 separates messaging gateway 115 from e-mail server 140, firewall 155 separates gateway 115 from Internet server 145, firewall 160 separates messaging gateway 115 from database 110, and firewall 165 separates messaging gateway 115 from network elements 120.

In this embodiment, messaging gateway 115 is responsible for many of the operating aspects of the encryption system. Typically, messaging gateway is an interactive element that both sends and receives messages transmitted over the wireless communication system. Messaging gateway 115 may perform functions such as formatting messages for transmission over the wireless system using a prespecified protocol, encrypting and decrypting messages, interpreting the contents of messages, parsing messages for new password keys, embedding new password keys in outgoing messages, interacting with and managing database 110, interacting with Internet server 145 and e-mail server 140, communicating with network elements 120, and numerous other communications functions. While messaging gateway 115 is depicted as a single element on FIG. 1, messaging gateway 115 may comprise many separate elements. For example, messaging gateway 115 may comprise a separate encryption computer. The operation of messaging gateway 115 is better understood with reference to the flowcharts described later in this application.

Figure 3:
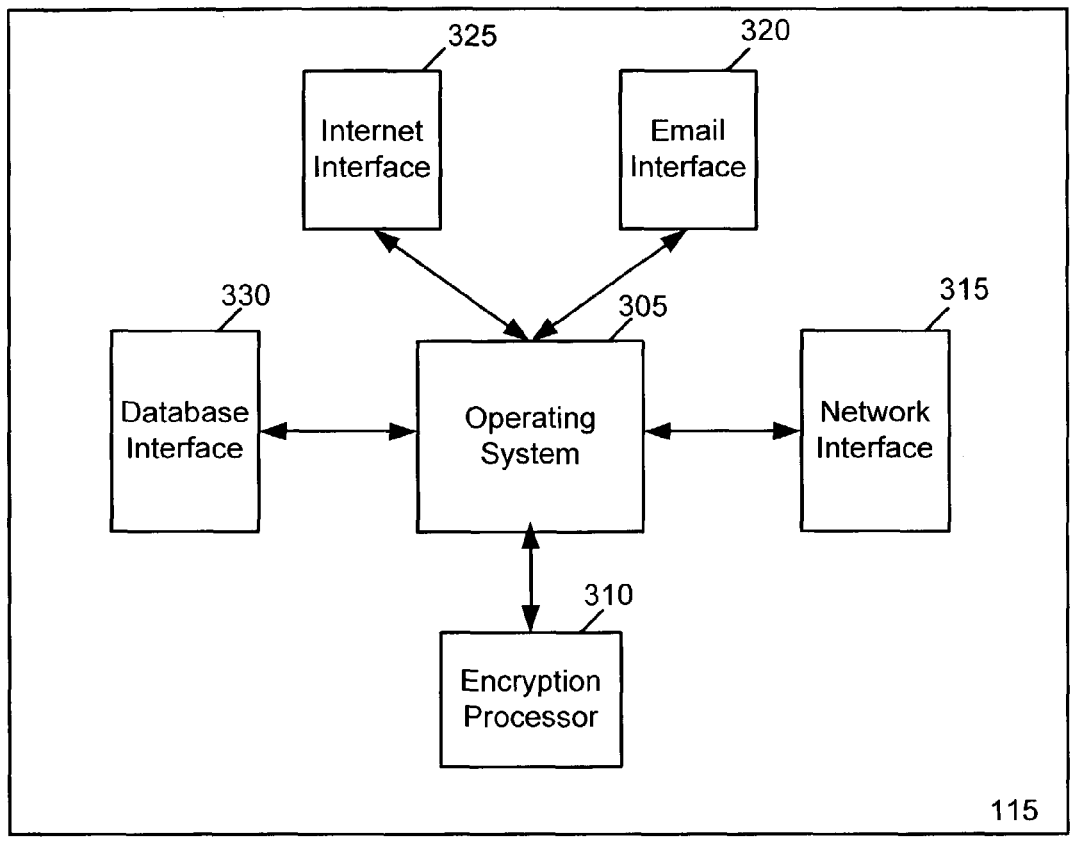
FIG. 3 is a block diagram of a gateway component depicted in FIG. 1 consistent with the principles of the present invention.

Messaging gateway 115 is also better understood with reference to FIG. 3. FIG. 3 is a block diagram of a typical messaging gateway 115 consistent with the principles of the present invention. In the exemplary embodiment of FIG. 3, messaging gateway 115 comprises operating system 305, encryption processor 310, network interface 315, e-mail interface 320, Internet interface 325, and database interface 330. Operating system 305 is in communication with encryption processor 310, network interface 315, e-mail interface 320, Internet interface 325, and database interface 330. In alternate embodiments of the present invention, the elements depicted in FIG. 3 may be in communication with each other as well as with operating system 305.

The operating system 305 of messaging gateway 115 typically contains the algorithms, software, and hardware necessary to perform its various functions. For example, operating system 305 may contain an algorithm that is used to parse a new password key from a received message. Further operating system 305 may contain logic that is used to determine the contents of an incoming message, format an outgoing message, and interact with the various other elements of wireless communication system 100.

Encryption processor 310 of messaging gateway 115, in the example of FIG. 3, encrypts and decrypts messages traveling over wireless communication system 100. Typically, encryption processor 310 includes a computer and an algorithm. In one embodiment, encryption processor 310 may be configured to perform DES encryption and decryption or triple DES encryption and decryption.

As is commonly known by those skilled in the art, DES encryption encrypts and decrypts data in 64 bit blocks using a 64 bit key, although the effective key strength is only 56 bits because of parity bits. The DES encryption algorithm takes a 64-bit block of text as input and outputs a 64-bit block of encrypted text. In one implementation, DES encryption has 16 rounds meaning that the main algorithm is repeated 16 times to produce the encrypted text. As is commonly known, the number of rounds is exponentially proportional to the amount of security provided. The DES encryption algorithm is readily available from the National Institute of Standards and Technology (NIST).

Triple DES is a variation of the DES encryption algorithm. Typically, it is three times slower than DES but billions of times more secure. In triple DES, three 64-bit keys, for an overall key length of 192 bits, may be used. In one implementation of triple DES, the data is encrypted with the first 64-bit key, decrypted with the second 64-bit key, and finally encrypted with the third 64-bit key. As in the DES algorithm, data encrypted with triple DES is encrypted in 64-bit blocks. In addition, triple DES can be operated in various modes of operation such as triple electronic code book and triple cipher block chaining. These algorithms are known to one skilled in the art and are readily available from NIST.

While two encryption algorithms are discussed generally, the communication system of the present invention is adaptable to use any encryption algorithm. For example, encryption processor 310 may contain an algorithm for an advanced encryption standard ("AES") which is being developed by the NIST.

Messaging gateway 115 further comprises a group of interfaces. Network interface 315 serves to facilitate communications between operating system 305 and network elements 120. In this manner, network interface 315 may be a simple bus or may contain software, algorithms, and hardware for translating communications between operating system 305 and network elements 120. Likewise, e-mail interface 320 and Internet interface 325 enable operating system 305 to communicate with e-mail server 140 and Internet server 145 respectively. As is commonly known, e-mail interface 320 and Internet interface 325 may be implemented with commercially available interface cards.

Database interface 330, in the example of FIG. 3, facilitates communication between operating system 305 and database 110. In this manner, messaging gateway 115, through operating system 305, may store data on database 110. Likewise, messaging gateway 115, through operating system 305, may retrieve data from database 110. Database interface 330 may facilitate these storage and retrieval operations.

Returning now to FIG. 1, e-mail server 140 and Internet server 145, as is commonly known, each comprise a computer. Internet server 145 is connected to the Internet 170. In this manner, Internet server 145 facilitates communication between the Internet 170 and messaging gateway 115. Likewise, e-mail server 140 facilitates the movement of e-mail messages to messaging gateway 115.

For example, a wireless subscriber may wish to receive e-mail on his wireless device. E-mail server 140 may transmit this e-mail through messaging gateway 115, network elements 120, communications tower 125 and over the air to wireless device 135. Likewise, a wireless subscriber may reply to an e-mail from his wireless device. In such a case, a reply would be sent from wireless device 135 to communications tower 125 and then to e-mail server 140 via network elements 120 and messaging gateway 115. E-mail server 140 and Internet server 145 may each be implemented with commercially available servers.

Password generator 105 randomly generates new password keys for use in wireless communication system 100. For example, password key generator 105 may be a random number generator which generates numbers in a given range. Those random numbers may then become password keys for use in the encryption and decryption methods of wireless communication system 100. In the example of FIG. 1, password generator 105 is a computer with a random number generator algorithm. In other aspects of the present invention, password generator 105 may be any type of device that is capable of randomly generating password keys. In addition, password generator 105 may be contained within messaging gateway 115. In this configuration (not shown) password generator may simply be an algorithm resident on memory or a memory device in messaging gateway 115.

Network elements 120 provide an interface between messaging gateway 115 and communications tower 125. Typically network elements 120 comprise the various pieces of equipment that are necessary to transmit messages sent from messaging gateway 115 to communications tower 125. For example, network elements 120 may comprise radios, autotune combiners, filters, and various couplers and cabling to interconnect this equipment. Typically, network elements 120 comprise the equipment that is situated at a wireless communication site such as a cellular site.

Communications tower 125 is typically a cellular tower with various antennas. In this manner, the antennas on communications tower 125 transmit the signal generated by network elements 120 for transmission over the air to wireless devices 130 and 135.

Wireless devices 130 and 135 can be any type of wireless device such as a cellular phone, pager, Blackberry, PDA, or integrated phone and data device. As depicted in FIG. 1, wireless device 130 is a cellular phone, and wireless device 135 is a pager.

Figure 2:
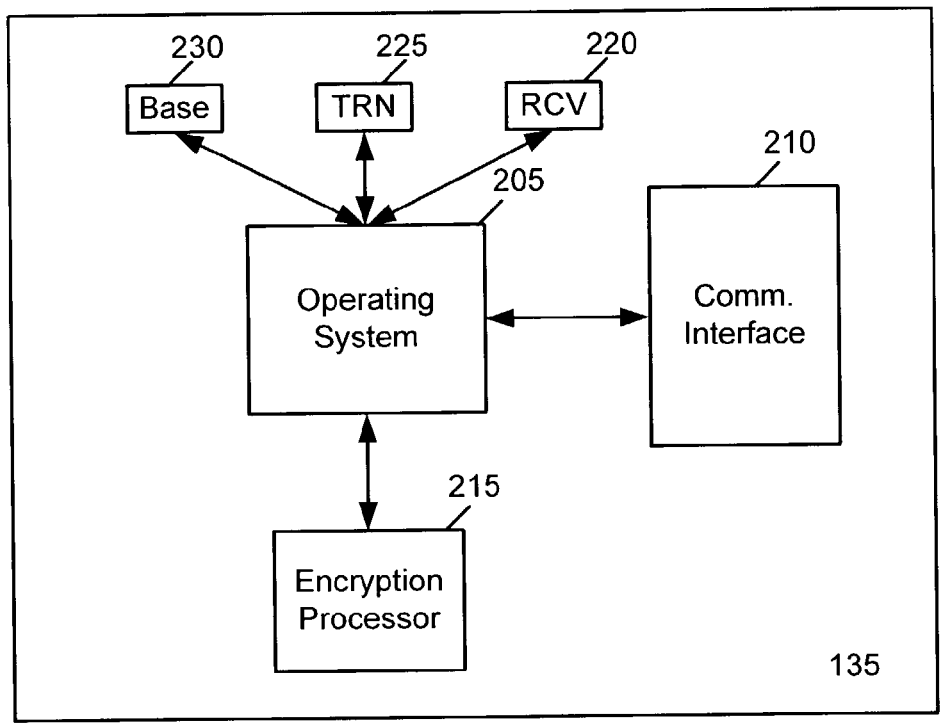
FIG. 2 is a block diagram of a wireless device depicted in FIG. 1 consistent with the principles of the present invention.

Wireless devices 130 and 135 can be better understood with reference to FIG. 2. FIG. 2 is a block diagram depicting some of the elements contained within wireless device 135. In the example of FIG. 2, wireless device 135 comprises an operating system 205, a communications interface 210, an encryption processor 215, and three nonvolatile memory positions for three different password keys, 220, 225 and 230.

Operating system 205 handles all the various functions of wireless device 135. For example, operating system 205 may comprise a processor, associated memory, and an algorithm for the proper operation of wireless device 135. Operating system 205 is interconnected to communications interface 210, encryption processor 215, and the three password key storage locations, 220, 225, and 230. Communications interface 210 facilitates communications between operating system 205 of wireless device 135 and the remainder of wireless communication system 100. For example, communications interface 210 may be the transmitter on a wireless device.

In the example of FIG. 2, wireless device 135 also includes an encryption processor 215. While depicted as a separate element in FIG. 2, encryption processor 215 may be integrated into operating system 205 of wireless device 135. Encryption processor 215 contains the logic and algorithms necessary to perform the encryption and decryption functions associated with wireless communication system 100. For example, encryption processor 215 may decrypt messages that are received on wireless device 135 and may also encrypt messages that are to be transmitted from wireless device 135.

The three storage locations, 220, 225 and 230 for three password keys are typically implemented with nonvolatile memory. In this manner, when wireless device 135 is switched off, the three password keys contained in storage locations 220, 225, and 230 are not erased. These three storage locations contain password keys that are used in encrypting and decrypting messages over wireless communication system 100. In an alternate embodiment of the present invention, encryption processor 215 may be in direct communication with the three password key storage locations 220, 225, and 230.

Returning now to the embodiment of FIG. 1, database 110 stores information about wireless devices 130 and 135 as well as password key information. Database 110 typically stores an identification number for each wireless device operating on wireless communication system 100. Associated with the identification number is information about the device and the various password keys for use with that device. Database 110 can be implemented in any number of ways, including typical commercially available database packages. Database 110 may comprise a processor or computer, transient memory, and long-term memory.

Figure 4:
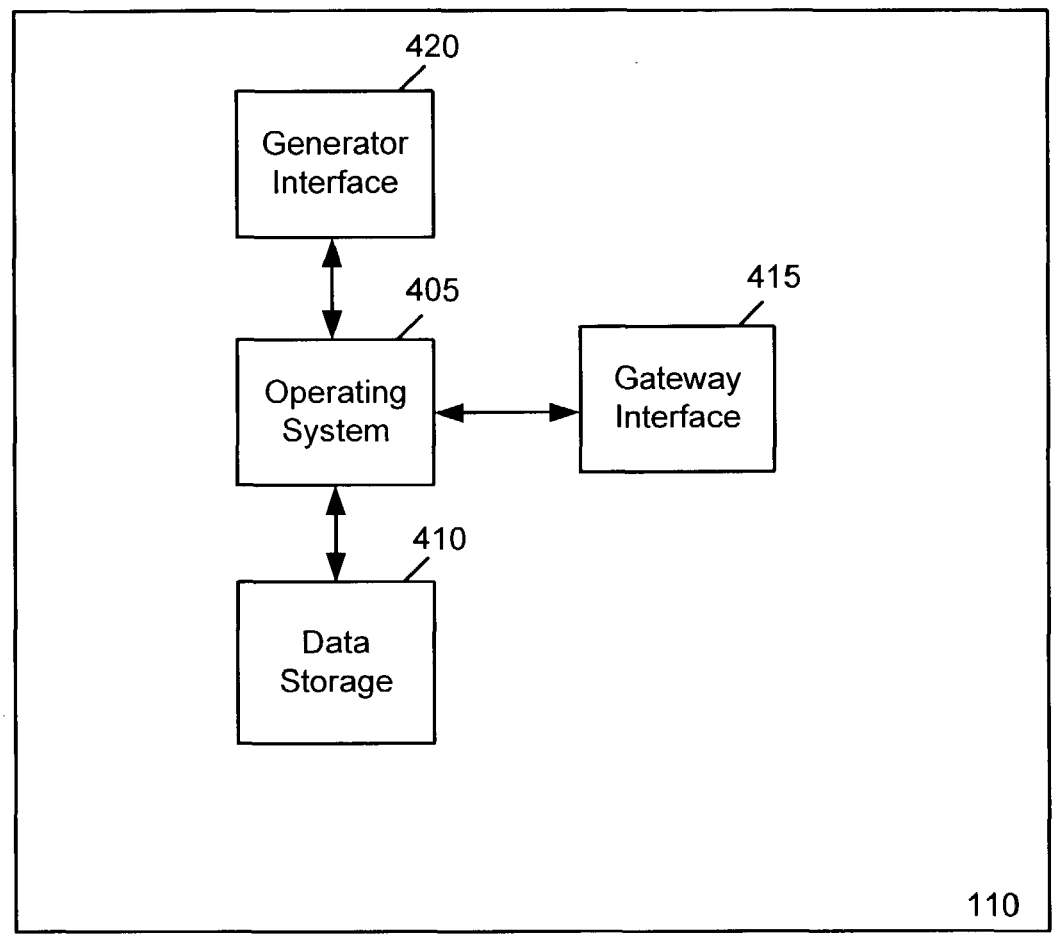
FIG. 4 is a block diagram of a database depicted in FIG. 1 consistent with the principles of the present invention.

The operation of database 110 can better be understood with reference to the block diagram of FIG. 4. FIG. 4 is a block diagram depicting the various elements of database 110 of FIG. 1. In the example of FIG. 4, database 110 comprises an operating system 405, data storage 410, a gateway interface 415, and a generator interface 420. Operating system 405 is interconnected with data storage 410, gateway interface 415, and generator interface 420. Operating system 405, which may be a computer algorithm, is responsible for the functioning of database 110. For example, operating system 405 may process the storage and retrieval functions associated with database 110.

Data storage 410 can comprise both short-term and long-term memory. In one embodiment, data storage 410 comprises short-term memory such as RAM. In addition, data storage 410 may also comprise long-term storage such as disk space. Data storage 410 may be implemented with any number of commercially available data storage products such as magnetic disks and tapes or optical disks.

Gateway interface 415 and generator interface 420 facilitate communications between operating system 405 of database 110 and messaging gateway 115 and password generator 105 respectively. In this manner, operating system 405 via generator interface 420 may communicate with password generator 105. Likewise, operating system 405 via gateway interface 415 may communicate with messaging gateway 115. In one aspect of the present invention, password generator 105, which may be a random number generator, produces password keys that are stored in data storage 410 of database 110.

Figure 5:
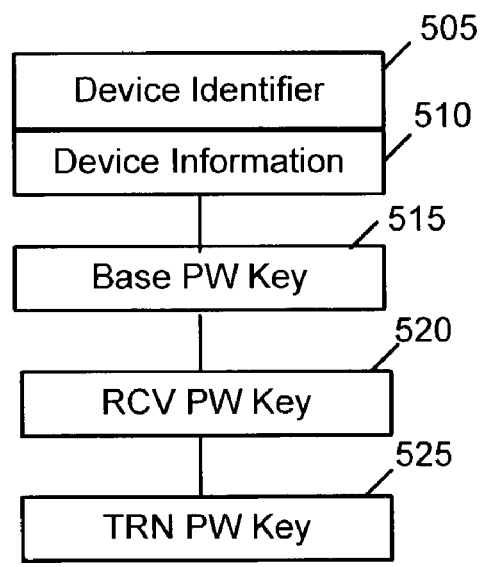
FIG. 5 is an exemplary database structure for the database depicted in FIG. 4 consistent with the principles of the present invention.

Referring now to FIG. 5, a simple database structure is depicted. The database structure of FIG. 5 may be stored within data storage 410 of database 110. As is seen in FIG. 5, a database structure can take the form of a table or linked list. In this case, the database structure comprises a device identifier 505, device information 510, a base password key 515, a receive password key 520 and a transmit password key 525. In this case, the device identifier may be a mobile access number (MAN), a mobile identification number (MIN) or any other type of unique identifier associated with a single wireless device. In this case, the device identifier may be a primary key in a database structure stored in data storage 410. Associated with this device identifier 505 is device information 510. Device information 510 may include information such as the type of wireless device, the phone number for the wireless device, various preferences of a wireless device user, and various attributes of the wireless device. Also associated with the device identifier are three password keys, base password key 515, receive password key 520 and transmit password key 525. In this manner, a unique device identifier associated with a wireless device on wireless communication system 100 has associated with it in database 110 password keys used in secured communication methods.

Returning now to FIG. 1, one possible operation of the initial loading phase of the wireless device 135 and database 110 in the wireless communication system 100 is described. In the exemplary embodiment of FIG. 1, loader 175 is interconnected to database 110 and wireless device 135. Loader 175 is typically a computer configured to download various algorithms and information to both wireless device 135 and database 110. As is commonly known, a wireless device must be configured in order to operate on a particular wireless communication system. Loader 175 performs some of these initial configurations processes.

Typically, loader 175 loads software, a service book, and an initial password key onto wireless device 135. The software and service book typically govern the functioning of wireless device 135 on wireless communication system 100. For example, the service book downloaded by loader 175 to wireless device 135 may contain information about the communication protocols used in wireless communication system 100. Wireless device 135 receives the software, service book, and initial password key in non-volatile memory. In this manner, when wireless device 135 is switched off, the software, service book, and initial password key remain in its memory.

Additionally, loader 175 sends the initial password key along with various information about wireless device 135 to database 110. In one embodiment, database 110 creates a new record for the information and password key associated with wireless device 135. For example, database 110 may create a new record identified with the MAN, MIN, or other identifier for wireless device 135. Database 110 associates the wireless device information with the initial password key based on this identifier. In this fashion, each time a new wireless device 135 is configured by loader 175, database 110 creates a new record in its storage for that new wireless device.

Typically, wireless device 135 is docked only once with loader 175. It is during this single docking that loader 175 transfers an initial password key to wireless device 135. Wireless device 135 then uses this initial password key for the first message it transmits or receives on wireless communication network 100. Likewise, database 110 also contains a record of this initial password key associated with wireless device 135.

Wireless communication system 100, and particularly gateway 115, then uses this initial password key to send a first message to wireless device 135 or to receive a first message from wireless device 135. Additionally, this initial password key is stored in database 110 and in nonvolatile memory in wireless device 135 so as to facilitate a synchronization function performed if a current password key is inoperable. In this manner, both wireless device 135 and database 110 have an initial password key that can be used to facilitate encrypted communications at some point in the future.

FIG. 1 also depicts the components of wireless communications system 100 that are typically used in transmitting a new password key from the wireless network to a wireless device 135. In this communication path, password generator 105 is connected to message gateway 115. Database 110 is connected via firewall 160 to message gateway 115. Message gateway 115 is connected to network elements 120. Network elements 120 are connected to communications tower 125. Communications tower 125 sends wireless signals to wireless device 135.

In a typical password key change sequence initiated by the wireless network, and more particularly initiated by message gateway 115 or some other component of wireless communication system 100, password generator 105 generates a new password key. Message gateway 115 receives this new password key form password generator 105. Message gateway 115 embeds the new password key along with a password key indicator in a message. Message gateway 115 accesses database 110 for information about wireless device 135. Message gateway 115 further accesses database 110 for the initial password key or the current password key associated with wireless device 135. Message gateway 115 then uses this initial or current password key to encrypt the message that has the new password key embedded in it. Message gateway 115 sends this encrypted message to network elements 120. Alternatively, message gateway 115 formats the encrypted message before sending it to network elements 120. Message gateway 115 stores the new password key on database 110. In one embodiment, message gateway 115 replaces the current password key with the new password key on database 110. After network elements 120 receives the encrypted message, the message is processed for transmission on communications tower 125. The encrypted message is transmitted via radio waves from communications tower 125 to wireless device 135. Wireless device 135 receives the encrypted message, decrypts the encrypted message, searches the decrypted message for the password key indicator, parses the new password key from the message, and stores the new password key in nonvolatile memory. In one embodiment of the present invention, wireless device 135 replaces a current password key with the new password key in its nonvolatile memory.

While this message flow is depicted in a particular manner, numerous other message flows are consistent with the present invention. For example, message gateway 115 may interface with database 110 in order to receive a new password key generated by password generator 105. In this manner, password generator 105 may interface with database 110. In addition, the flow charts of FIGS. 8-13 serve to illustrate some of the possible communication paths that can be traced through the equipment depicted in FIG. 1.

FIG. 1 also illustrates one possible communications path from a wireless device 135 to the wireless network. In the exemplary embodiment of FIG. 1, wireless device 135 communicates with communications tower 125 via radio waves. Communications tower 125 is interfaced to network elements 120. Network elements 120 are connected to message gateway 115. Message gateway 115 interfaces with database 110 through firewall 160.

In a typical password key change protocol initiated by a wireless device, wireless device 135 generates a new password key. Wireless device 135 embeds the new password key and a password key indicator in a message. Wireless device 135 then encrypts this message using the current password key. In this manner, the message with the new password key is encrypted using the previous or current password key. Wireless device 135 then stores the new password key in its nonvolatile memory. In one aspect of the present invention, wireless device 135 replaces the current password key with the new password key. Wireless device 135 may also format the encrypted message for transmission to communications tower 125. Wireless device 135 then transmits the encrypted message to communications tower 125.

Communications tower 125 receives the encrypted message and sends it to network elements 120. Network elements 120 receive the encrypted message, perform the necessary formatting functions, and send the encrypted message to message gateway 115. Message gateway 115 receives the encrypted message, decrypts the encrypted message with the current password key, searches the decrypted message for a password key indicator, parses out the new password key from the decrypted message, and stores the new password key in database 110. In another aspect of the present invention, message gateway 115 replaces the current password key stored in database 110 with the new password key that it parsed from the decrypted message.

In another embodiment of the present invention, message gateway 115 receives the encrypted message and accesses database 110 for information about wireless device 135. In this manner, message gateway 115 receives an encrypted message from wireless device 135. That encrypted message may contain header information identifying as the sender wireless device 135. Message gateway 115 then takes this header information and uses it to look up information about wireless device 135 stored on database 110. Message gateway 115, after accessing the wireless device information and password key information stored on database 110, then decrypts the encrypted message using the password key information stored on database 110. In this manner, the current password key stored on database 110 is used to decrypt the encrypted message sent by wireless device 135. Message gateway 115 then searches the decrypted message for a password key indicator, parses out the new password key from the decrypted message, and replaces the current password key with the new password key on database 110. The message itself can then be sent to its destination.

For example, the user of wireless device 135 may send an e-mail to a destination address. After entering the e-mail into wireless device 135, wireless device 135 may then initiate a password key change and embed a new password key along with a new password key indicator into this e-mail. Wireless device 135, as previously described, then encrypts this e-mail message and sends it to message gateway 115. After message gateway 115 performs the decrypting, searching, parsing, and replacing functions, message gateway 115 may then forward the e-mail message to its destination address. In forwarding this e-mail message, encryption may or may not be used.

Figure 6:
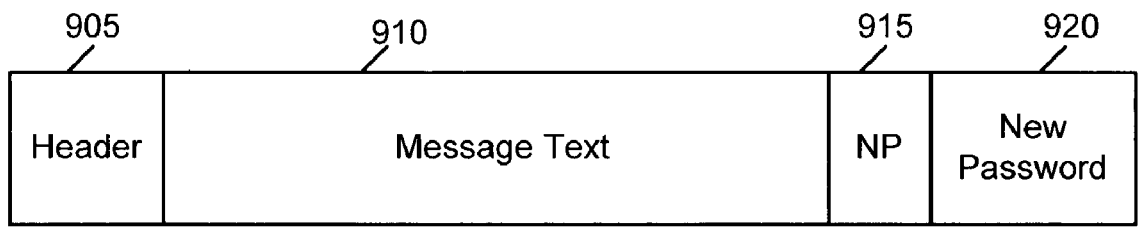
FIGS. 6 and 7 depict exemplary message structures consistent with the principles of the present invention.
Figure 7:
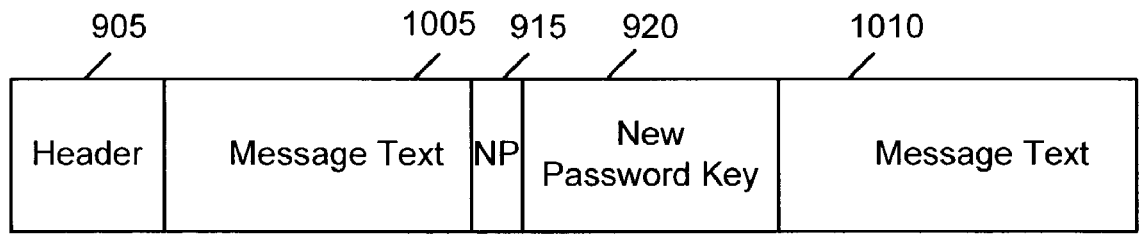

FIGS. 6 and 7 depict an exemplary data structure for a message transmitted over the wireless communications system 100 of FIG. 1. In FIG. 6, the data structure includes a header 905, message text 910, a new password key indicator 915, and a new password key 920. Likewise, the embodiment of FIG. 7 includes a header 905, message text 1005, a new password key indicator 915, a new password key 920, and additional message text 1010. The exemplary message data structure of FIGS. 6 and 7 may be packaged so as to be compatible with numerous wireless protocols. For example, the exemplary message data structure of FIGS. 6 and 7 may be compatible with a Mobitex network. Alternatively, these data structures may be compatible with a TDMA, GSM, GPRS, UMTS or other wireless communications protocol. The data structures and message structures of the present invention are also independent of the type of network on which they are operated.

Referring now to FIG. 6, header 905 typically includes a destination address, origination address, and other information about the message itself and the wireless device sending or receiving that message. As is commonly known, header 905 has a particular format based on the type of messaging protocol employed.

A second component of the exemplary message data structure of FIG. 6 is message text 910. Message text 910 may take on any format and may be encrypted. Further, the remaining components of the exemplary message data structure of FIG. 6 may be encrypted, as well. Message text 910 has embedded in it a new password key indicator 915 and a new password key 920. As depicted in FIG. 6, the new password key indicator 915 and the new password key 920 follow message text 910 as a suffix. In this manner, the basic data structure of a message comprises first, a header 905; second, message text 910; third, a new password key identifier 915; and fourth, a new password key 920.

The new password key identifier 915 can take the form of a simple string of characters. For example, new password key identifier 915 may be in the form of: NP, ..NP, *NP, NP, ;;NP, or any other short sequence of character(s). Further, new password key identifier 915** may be some other sort of identifier or delimiter and need not be an ASCII character or combination of ASCII characters.

New password key 920 is typically a random number. In an exemplary embodiment, the length of the new password key may be between six and 80 characters. For example, in a typical triple DES encryption method, the new password key is 192 bits or 24 bytes long. The length of new password key 920 is set so as to balance security requirements with the use of a fixed message bandwidth. For example, in a Mobitex protocol, a message is typically 512 bytes long. The length of the new password key affects the total number of remaining bytes available in a given Mobitex message for transmitting a message text. In the typical triple DES encryption method, new password key 920 is 24 bytes long and the remaining portion of the data structure (the header 905, the message text 910, and the new password key identifier 915) may occupy, for example, 488 bytes.

Referring now to the exemplary message data structure of FIG. 7, the new password key identifier 915 and the new password key 920 are embedded between message text 1005 and message text 1010. In this manner, the data structure of a typical message may first include a header 905, followed by message text 1005. Message text 1005 may then be followed by a new password key identifier 915 and a new password key 920. New password key 920 may then be followed by additional message text 1010. As previously mentioned, all the elements of the exemplary message data structure of FIG. 7 may be encrypted.

The new password key identifier 915 and the new password key 920 may be positioned at any location within the message data structure of FIGS. 6 and 7. In this manner, security is enhanced as the particular location of a new password key indicator and a new password key may be random. For example, the new password key identifier 915 and new password key 920 may be randomly placed at any point within the message text, the header 905, or any other component of the exemplary message data structure of FIGS. 6 and 7. By placing the new password key identifier 915 and new password key 920 in a random location in a given message data structure, security is increased since a person intercepting a message may not be able to determine the location of the new password key indicator and the new password key. Further, the length of the new password key 920 may also be random.

Figure 8:
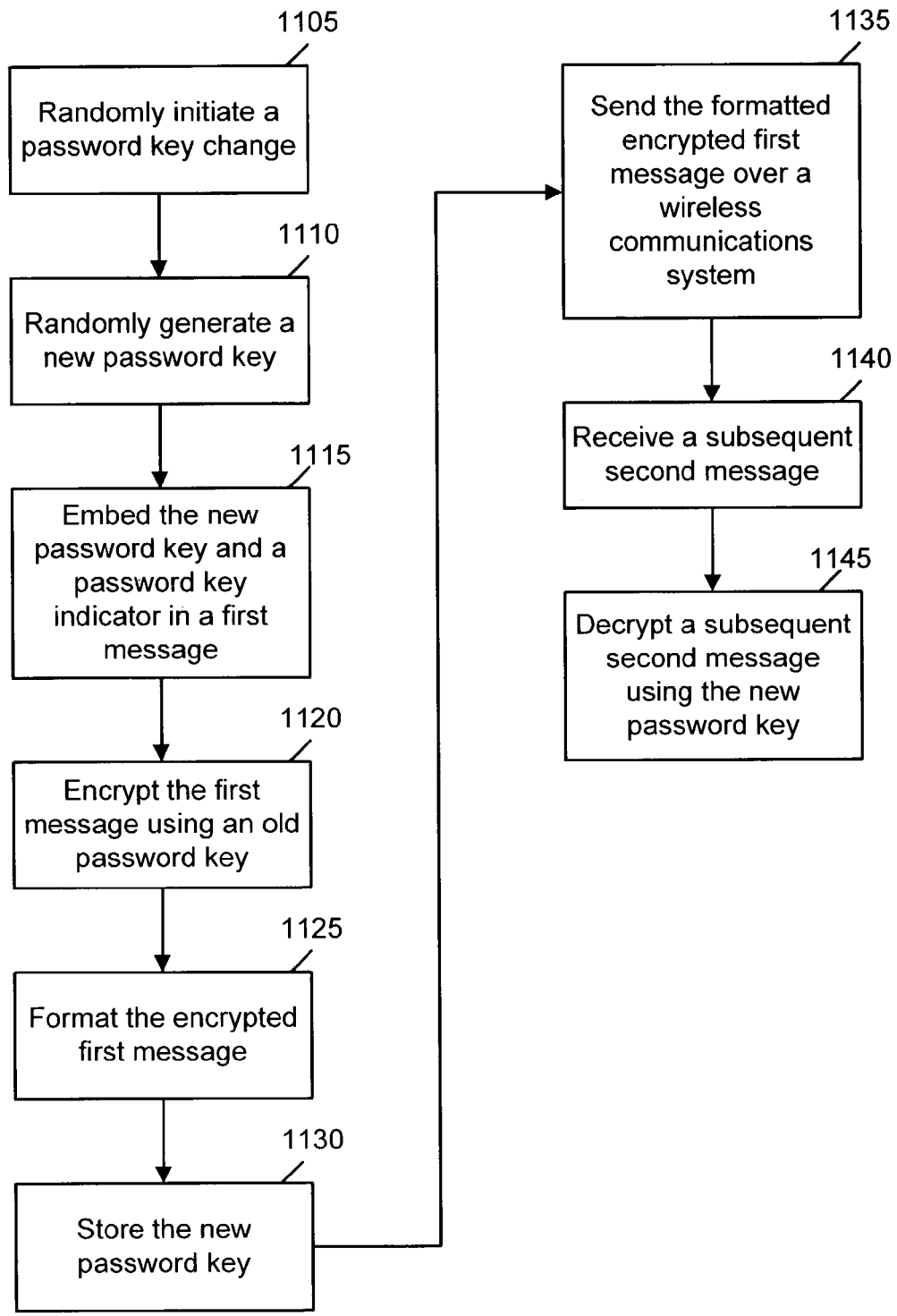
FIG. 8 is a flowchart depicting a password key change initiated by a gateway component consistent with the principles of the present invention.

Referring now to FIG. 8, the depicted flow chart describes a method of changing a password key consistent with the principles of the present invention. In exemplary step 1105, a password key change is randomly initiated. A password key change may be initiated by the wireless network, and more particularly by messaging gateway 115, or it may be initiated by a wireless device, such as wireless device 135. There are many different ways in which a password key change can be randomly initiated. For example, wireless device 135 and messaging gateway 115 may contain logic and an algorithm that handles the random initiation of password key changes. Alternatively, wireless device 135 may have a function that can be activated by a user to initiate a password key change. Alternatively, every message sent and received between wireless device 135 and messaging gateway 115 may contain a password key change.

In exemplary step 1110, a new password key is randomly generated. As previously described, password key generator 105 generates new password keys for messaging gateway 115, while wireless device 135 has incorporated within it a random password key generator.

In step 1115, the new password key and a new password key indicator are embedded in a first message. In step 1120, this message is then encrypted using an old password key. In this manner, the old password key, which is also called the current password key, is used to encrypt the message containing the new password key. In this example, both wireless device 135 and messaging gateway 115 has access to the old password key or current password key. Therefore, both the sending and receiving device have the current password key with which to decrypt the message.

In step 1125, the encrypted first message is formatted. In step 1130, the device that initiated the password key change stores the new password key. If wireless device 135 initiated the password key change, then wireless device 135 stores the new password key in its nonvolatile memory. Alternatively, wireless device 135 replaces the old or current password key with the new password key in its nonvolatile memory. If messaging gateway 115 initiated the password key change, then messaging gateway 115 stores the new password key in database 110. Alternatively, messaging gateway 115 replaces the old or current password key stored in database 110 with the new password key.

In step 1135, the formatted encrypted first message is transmitted over a wireless communications system. In step 1140, the device that initiated the password key change receives a subsequent second message. In step 1145, this device decrypts the subsequent second message using the new password key. It should be noted that in step 1140 the subsequent second message may also have a password change associated with it.

The method depicted in the flow diagram of FIG. 8 may be repeated many times by a transmitting device to facilitate multiple password changes. For example, wireless device 135 may send numerous messages sequentially, each message with a password key change. The last message sent, which contains the last password key sent, is received by messaging gateway 115. Messaging gateway 115 then extracts the last password key from the message and stores it in database 110. Messaging gateway 115 may then send a message encrypted, using this last password key, to wireless device 135. Wireless device 135, consistent with steps 1140 and 1145, then receives and decrypts this most recent message with the last password key.

Figure 9:
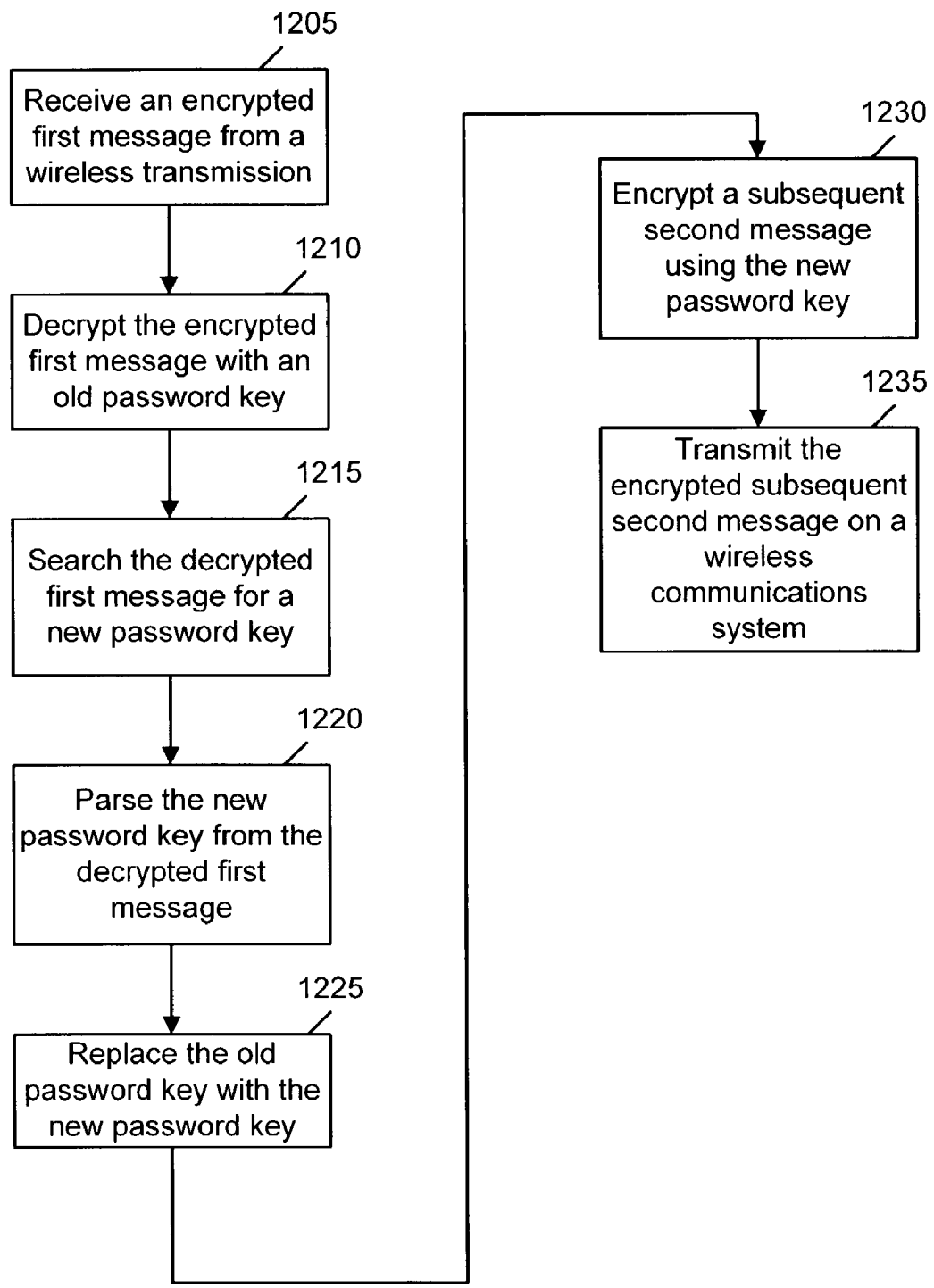
FIG. 9 is a flowchart depicting a password change initiated by a wireless device consistent with the principles of the present invention.

FIG. 9 is a flow chart depicting the receipt of a message with a password key change. In step 1205, a device receives an encrypted first message from a wireless transmission. In step 1210, the device decrypts the encrypted first message with an old password key. In this case, if wireless device 135 is the receiving device, then wireless device 135 uses its current password key (also denoted as the old password key) to decrypt the received message. In step 1215, the device searches the decrypted first message for a new password key. In this step, for example, the device may search for a new password key indicator to find the new password key. In step 1220, the device parses the new password key from the decrypted first message. In step 1225, the device replaces the old password key with the new password key. For example, if messaging gateway 115 is the receiving device, then the old password key stored in database 110 is replaced with the new password key. If wireless device 135 is the receiving device, then the old password key is replaced with the new password key in its nonvolatile memory. In this fashion, the most recently used password key is stored on both wireless device 135 and on database 110. Therefore, both the sending and receiving devices have access to a common password key that is continuously updated through subsequent messages.

In step 1230, the device encrypts a subsequent second message using the new password key. In step 1235, the device transmits the subsequent second message on a wireless communications system. In this manner, it is the last password key received (that is the last updated password key) that is used for encryption and decryption.

The methods of FIGS. 8 and 9 can be implemented in any order in a given series of messages. For example, the method of FIG. 8 in which a device initiates a password key change is followed by the method of FIG. 9 in which the receiving device receives the message with the password key change. In this manner, step 1135 of FIG. 8 may be followed by step 1205 of FIG. 9. For example, in FIG. 8, after the formatted encrypted first message is transmitted over a wireless communications system in step 1135, that formatted encrypted first message may contain a password key change. In such a case, the receiving device begins at step 1205 of FIG. 9 by receiving the encrypted first message. Likewise, step 1235 of FIG. 9 in which the device transmits an encrypted subsequent second message may incorporate the steps of FIG. 8. In such a case, the subsequent second message of steps 1230 and 1235 could contain a password key change.

Figure 10:
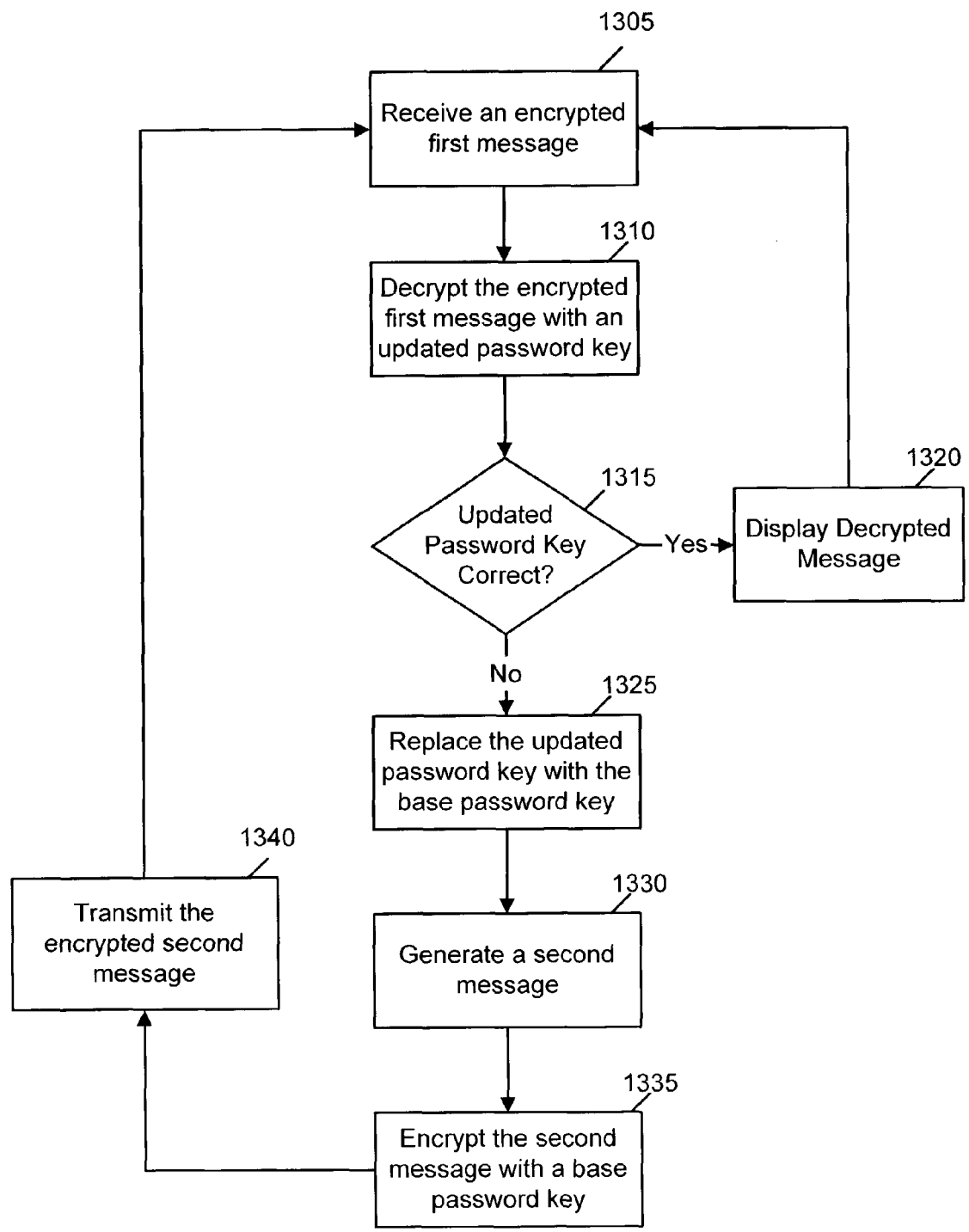
FIG. 10 is a flowchart depicting a synchronization method between a gateway component and a wireless device consistent with the principles of the present invention.

FIG. 10 is a flow chart depicting a password key synchronization method consistent with the principles of the present invention. At some point during the operation of wireless communications system 100 of FIG. 1, either the messaging gateway 115 or the wireless device 135 may suffer a transmit or receive error. In such a case, the most recent password key contained in the nonvolatile memory of wireless device 135 may be different than the most recent password key contained in database 110. In this case, when wireless device 135 sends a message to messaging gateway 115 using its password key, messaging gateway 115, using a different password key, would not be able to decrypt the message. In such a case, it is necessary to resynchronize the passwords used by messaging gateway 115 and wireless device 135. This resynchronization process may be implement by reverting back to a base password key or initial password key. Alternatively, this resynchronization process may be implemented by reverting back to a prior common password key.

Referring now to FIG. 10, in step 1305, a device receives an encrypted first message. In step 1310, the device decrypts the encrypted first message with an updated password key. In this case, the updated password key is the most recent applicable password key stored in the device. In step 1315, the device examines the decrypted message to determine if the updated password key is correct. For example, the decrypted message may be displayed on a screen of wireless device 135. The user of wireless device 135 may then see that the decrypted message doesn't make any sense. In such a case, the user of wireless device 135 may initiate a function that communicates to the wireless system that the updated password key is not correct. Alternatively, the wireless device 135 or the messaging gateway 115 may perform a function on the decrypted message to determine if the updated password key was the correct key to decrypt that message. For example, wireless device 135 may employ an algorithm that searches through the decrypted message for familiar text. If this familiar text is not found, then wireless device 135 may conclude that the updated password key was not the correct password key to decrypt the encrypted message. Likewise, messaging gateway 115 may also employ an algorithm that determines whether the updated password key was the correct password key to decrypt the encrypted message.

If the updated password key is correct, then the decrypted message is displayed as indicated in step 1320. Flow then proceeds to step 1305, in which the device waits for another message. If, in step 1315, the updated password key is incorrect, then the updated password key is replaced with the base or initial password key as depicted in step 1325. In this manner, the device receiving the message reverts back to a base or initial password key that was stored when the device was initially loaded. For example, if the receiving device is wireless device 135, then the initial or base password key was stored in its nonvolatile memory at the time the software and service book were loaded. Likewise, if the receiving device was messaging gateway 115, then database 110 would have stored on it an initial or base password key associated with that particular wireless device. In this manner, the wireless communications system reverts back to the initial or base password key for any subsequent communications.

In exemplary step 1330, the device generates a second message. In this case, the second message is an error message. For example, if wireless device 135 receives a message that it cannot decrypt, then it may send an error message to messaging gateway 115. This error message may contain information about the error or a request to resend the previous message using the base password key. In this manner, the device that receives the error message may revert back to the base password key and resend the previous message using an encryption method with the base password key. This process is depicted in step 1335, in which the second message is encrypted with the base password key. Finally, in step 1340, the encrypted second message is transmitted. Flow then proceeds to step 1305, in which the encrypted message is received.

Figure 11:
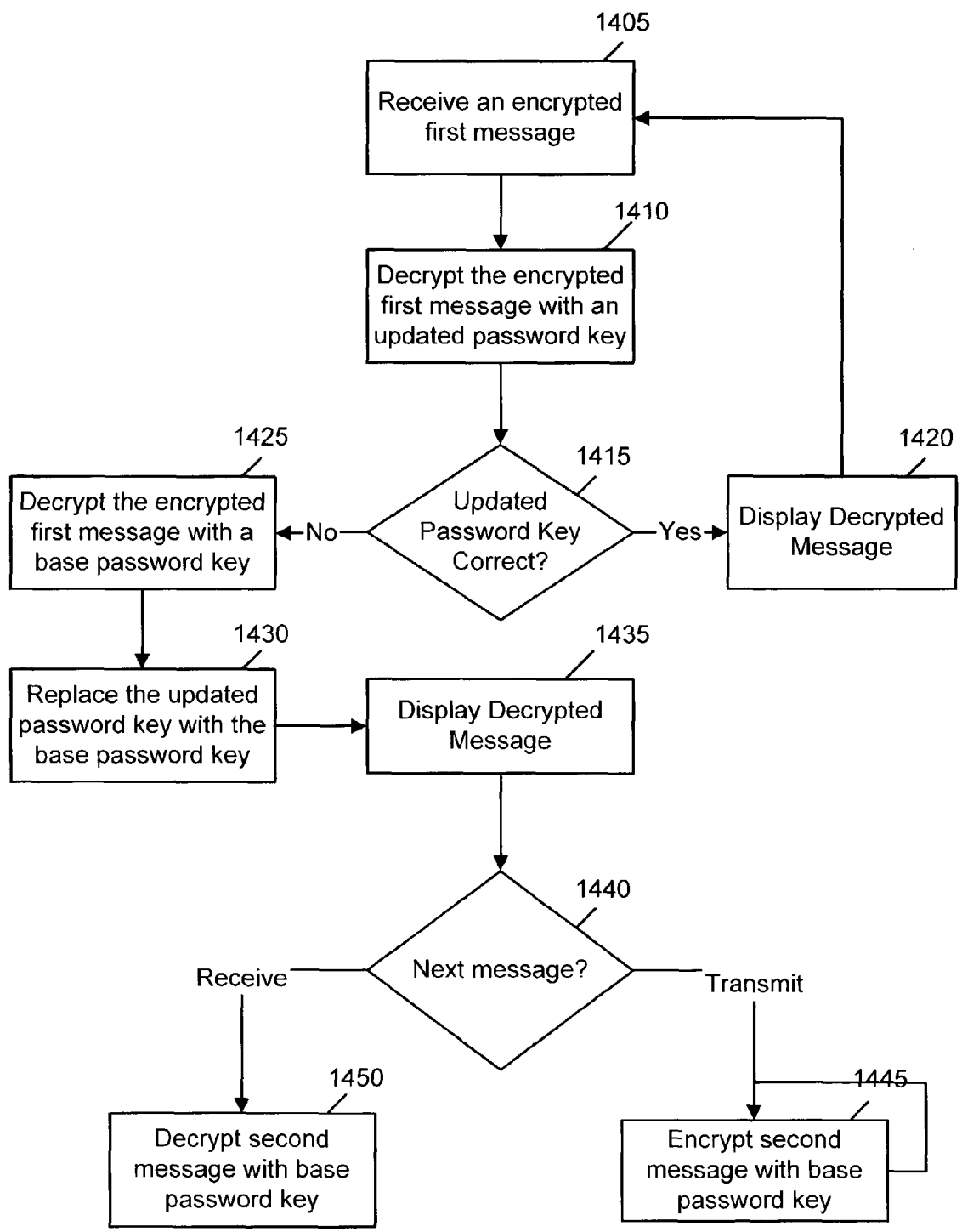
FIG. 11 is a flowchart depicting a synchronization method between a wireless device and a gateway component consistent with the principles of the present invention.

FIG. 11 depicts another synchronization method consistent with the principles of the present invention. In step 1405, an encrypted first message is received. In step 1410, the encrypted first message is decrypted with an updated password key. As previously mentioned, the most recent password key is used to decrypt this encrypted first message. In step 1415, the device determines whether the updated password key was the correct key to decrypt the encrypted message. As previously discussed, numerous methods can be used to determine if the updated password key was correct. If the updated password key was correct, then the message is displayed as depicted in step 1420. Flow then proceeds to step 1405, in which the device waits to receive a subsequent message. If in step 1415 the device determines that the updated password key is incorrect, then the encrypted first message is decrypted with a base password key as depicted in step 1425. In this manner, the device receiving the encrypted message first uses the most recent updated password key to decrypt the message. If the most recent updated password key does not work to decrypt the message, then the device uses the base or initial password key to decrypt the message. Therefore, the wireless communications system of 100, through the synchronization algorithm, may revert back to the base or initial password key.

In step 1430, the device replaces the updated password key with the base password key. In step 1435, the message decrypted with the base password key is displayed. In step 1440, the next message type is determined. If the next message is transmitted from the device, then in step 1445, the next message is encrypted with the base password key. If, in step 1440, the next message is received by the device, then the next message is decrypted with the base password key as depicted in step 1450.

While the synchronization methods of FIGS. 10 and 11 cause the wireless communications system 100 to revert back to a base or initial password key, the synchronization methods may be applied to revert back to any password key. For example, the synchronization methods of FIGS. 10 and 11 may cause wireless communications system 100 to revert back to any password key that is prior to the most recent updated password key. Alternatively, the wireless communications system 100, through the synchronization methods of FIGS. 10 and 11, may revert back to some other password key stored in both wireless device 135 and database 110.

In addition, the synchronization methods of FIGS. 10 and 11 may be used with any encryption system and not necessarily the one described herein. In the synchronization methods of FIGS. 10 and 11, no password key is transmitted between the gateway and the wireless device. As such, the synchronization methods are not limited for use with the dynamic password key methods described herein. For example, the password key synchronization methods may be used with any wireless system that utilizes more than one password key in encrypting and decrypting messages. In one embodiment, the synchronization methods may be used with an encryption system that rotates through a plurality of password keys.

Figure 12A:
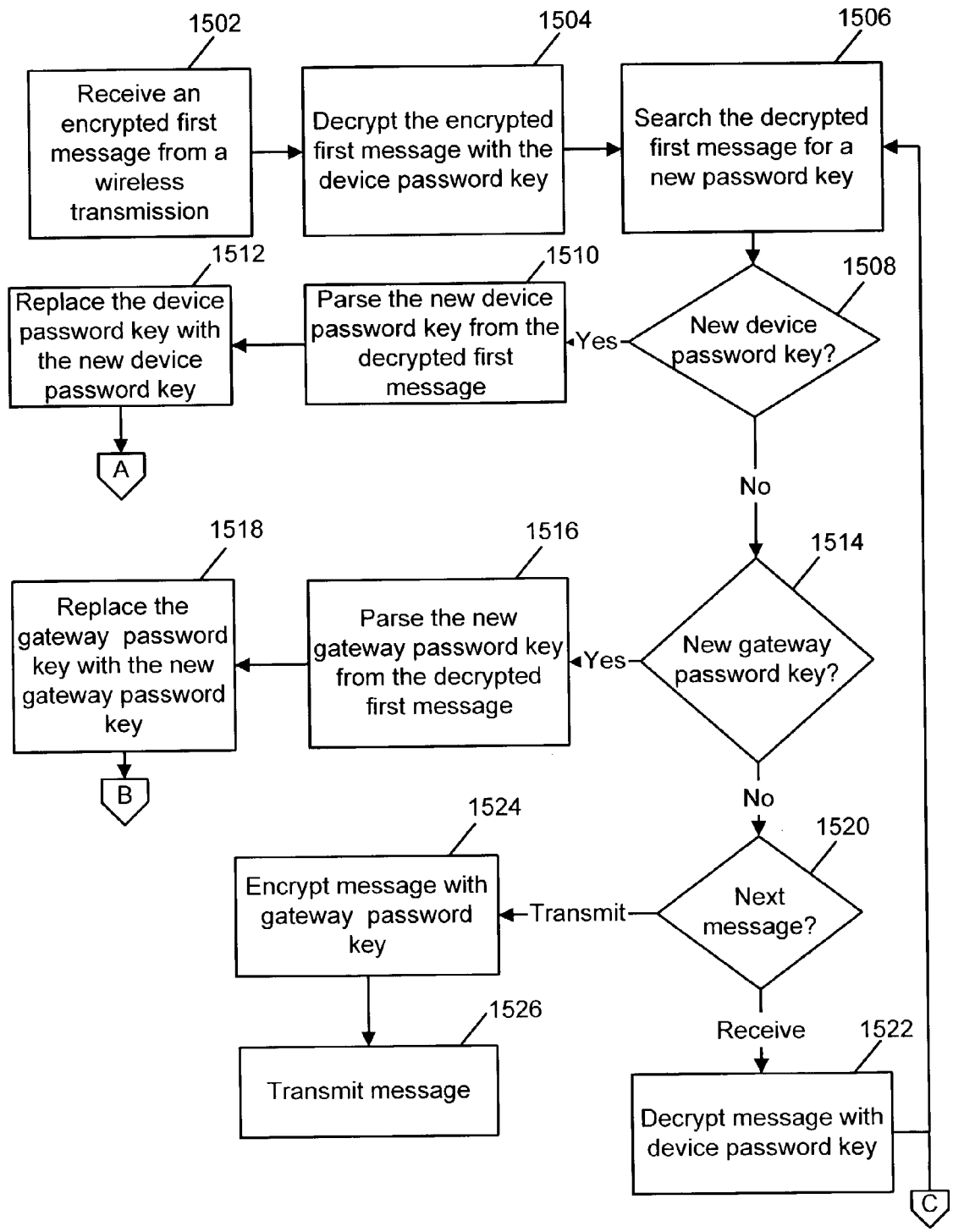
FIGS. 12A, 12B, and 12C are a flowchart depicting the operation of a wireless communication system using two independent password keys consistent with the principles of the present invention.
Figure 12B:
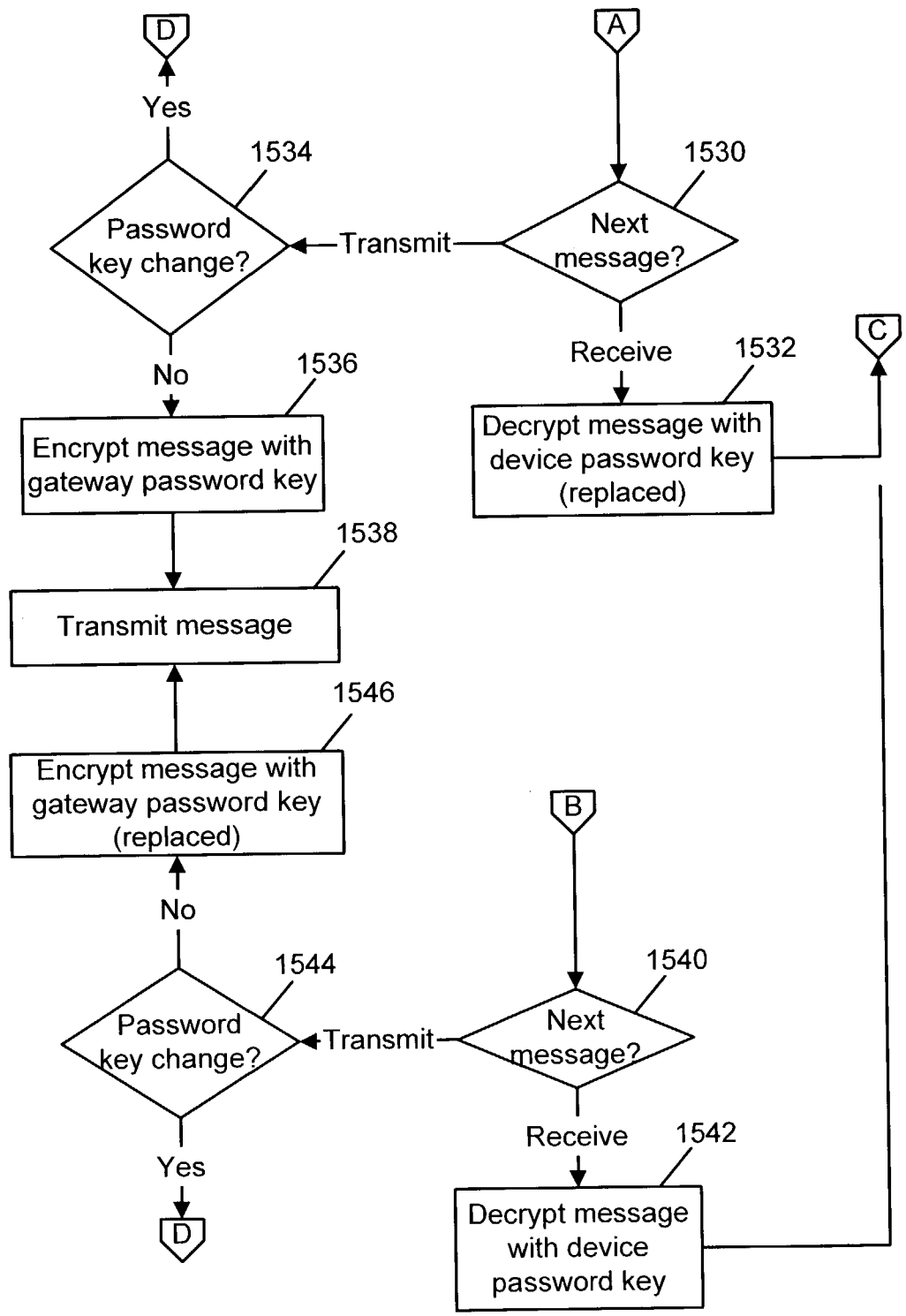
Figure 12C:
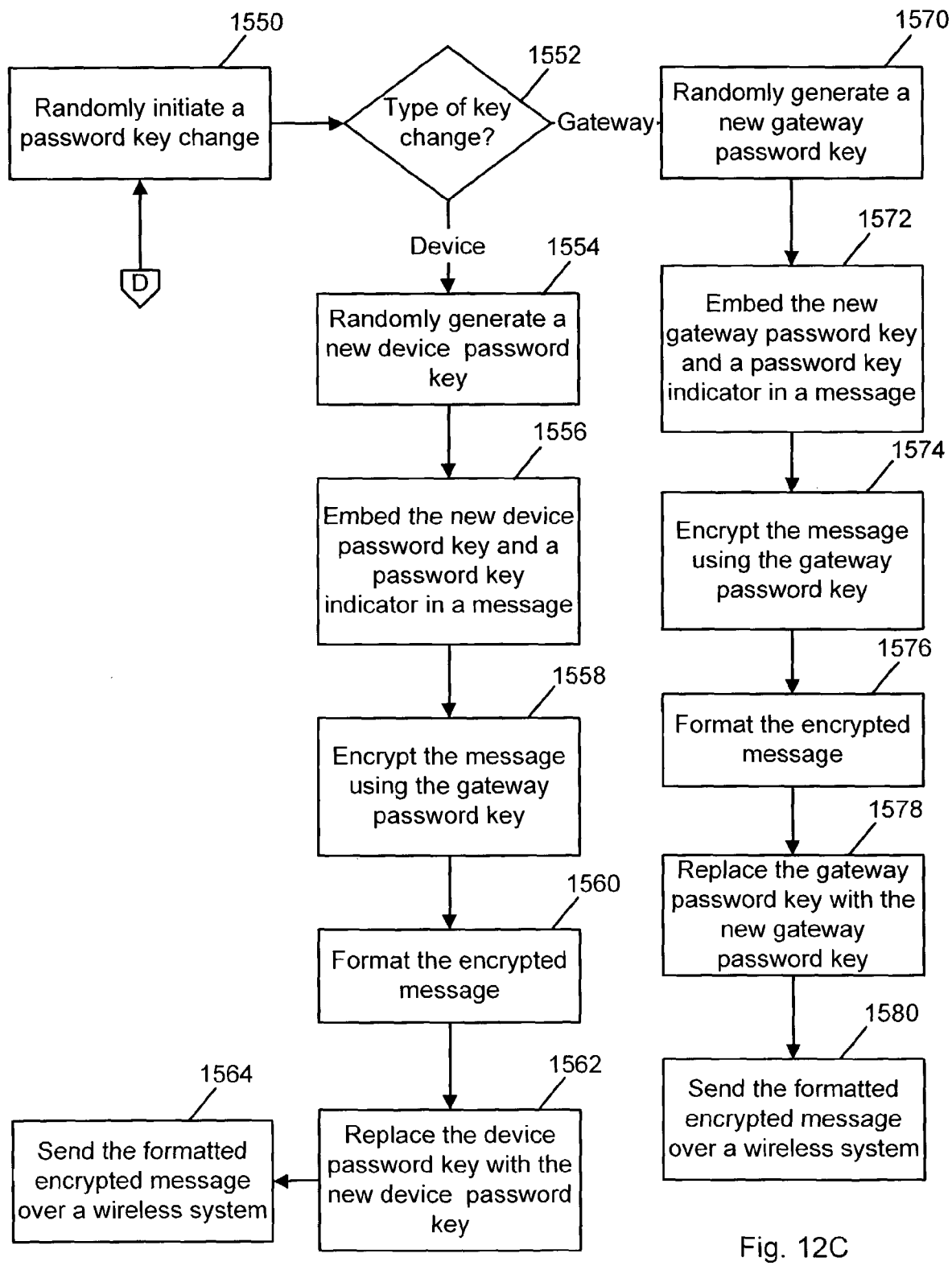

FIGS. 12A, 12B, and 12C depict a password key change for a two-password key system. In the exemplary method depicted in FIGS. 12A, 12B, and 12C, a transmit device has associated with it two different password keys. Likewise, a receive device has associated with it the same two password keys. For example, messaging gateway 115 may have a transmit password key and a receive password key associated with a particular wireless device. Likewise, wireless device 135 may have the same two password keys—a transmit password key and a receive password key. In FIGS. 12A, 12B, and 12C, these two password keys are referred to as the gateway password key and the device password key. In this example, any message initiated by wireless device 135 uses the device password key for encryption, while any message initiated by messaging gateway 115 uses the gateway password key for encryption. Further, the exemplary method of FIGS. 12A, 12B, and 12C allows a messaging gateway 115 to change either of the two password keys—the gateway password key or the device password key or both. Likewise, wireless device 135 may also change the gateway password key, the device password key, or both.

In one embodiment of the present invention, dual key encryption may be implemented. In such a case, password keys are typically generated in pairs. One of the pair of password keys is used to encrypt a message while the other password key is used to decrypt the message. The device and gateway password keys described with reference to FIGS. 12A, 12B, 12C, 13A, and 13B may be used to implement the well-known encryption method of dual key encryption.

Referring now to FIG. 12A, messaging gateway 115 receives an encrypted first message from a wireless transmission. In this case, messaging gateway 115 receives an encrypted first message from wireless device 135. In step 1504, messaging gateway 115 decrypts the encrypted first message with the device password key. In this case, the device password key is used because the message originates from wireless device 135. In step 1506, messaging gateway 115 searches the decrypted first message for a new password key. As previously mentioned, messaging gateway 115 may search the message for a new password key indicator. Flow then proceeds to step 1508, in which the messaging gateway 115 determines whether a new device password key is contained in the first message. If a new device password key is contained in the first message, then flow proceeds to step 1510, in which the messaging gateway 115 parses the new device password key from the decrypted first message. In step 1512, messaging gateway 115 then replaces the device password key stored in database 110 with the new device password key that it parsed from the first message.

Flow then proceeds to step 1530 of FIG. 12B, in which the messaging gateway 115 determines whether the next message is to be transmitted or received. If the next message is received from wireless device 135, then flow proceeds to step 1532. In this case, messaging gateway 115 receives the next message from wireless device 135. In step 1532, messaging gateway 115 decrypts this next message with the device password key. In this case, the device password key is the replaced device password key. In other words, it is the new device password key that was parsed from the first message. Flow then proceeds back to step 1506, in which the messaging gateway 115 searches the decrypted first message for another new password key. If in step 1530, the next message is a transmitted message, then flow proceeds to step 1534. In this case, messaging gateway 115 transmits the next message to wireless device 135. In step 1534, messaging gateway 115 determines whether there is a password key change associated with this next message. If there is no password key change associated with this next transmitted message, then flow proceeds to step 1536, in which messaging gateway 115 encrypts the message with the gateway password key. The gateway password key is used because the next message originates from messaging gateway 115. Flow then proceeds to step 1538, in which the encrypted message is transmitted to wireless device 135.

If, in step 1534, the next transmitted message contains a password key change, then flow proceeds to step 1550 of FIG. 12C. In step 1550, a password key change is randomly initiated. Flow then proceeds to step 1552, in which the messaging gateway 115 determines the type of password key change. In this case, messaging gateway 115 transmits a message with a new password key embedded in it. Messaging gateway 115 may embed a device password key or a gateway password key in the message that it is transmitting. Alternatively, messaging gateway 115 may embed both a device password key and a gateway password key in a single message. In this case, however, messaging gateway 115 only embeds a single new password key in the message it is transmitting. If the type of password key change is a device password key change, then flow proceeds to step 1554 in which the messaging gateway 115 randomly generates a new device password key. Alternatively, password key generator 105 randomly generates new device password key. In step 1556, messaging gateway 115 embeds the new device password key and a password key indicator in the message. In step 1558, messaging gateway 115 encrypts the message using the gateway password key.

In step 1560, messaging gateway 115 formats the encrypted message. In step 1562, messaging gateway 115 replaces the device password key with the new device password key. This is the second replacement for the device password key location in database 110. In step 1564, the messaging gateway 115 sends the formatted encrypted message over a wireless system. Flow then proceeds to step 1530 of FIG. 12B.

If, in exemplary step 1552 the type of password key change is a gateway password key change, then flow proceeds to step 1570. In step 1570, messaging gateway 115 randomly generates a new gateway password key. Alternatively, password generator 105 randomly generates the new gateway password key. In step 1572, messaging gateway 115 embeds the new gateway password key and a password key indicator in the message. In step 1574, messaging gateway 115 encrypts the message using the gateway password key. The message is encrypted with the gateway password key because the messaging gateway 115 is the device that is transmitting this message. Note that the new gateway password key is not used to encrypt the message because the wireless device 135 does not have access to the new gateway password key yet. Wireless device 135 must receive this message in order to discover the new gateway password key. In step 1576, messaging gateway 115 formats the encrypted message. In step 1578, messaging gateway 115 replaces the gateway password key stored in database 110 with the new gateway password key. In this manner, messaging gateway 115 initiates an overwrite operation in database 110, in which the new gateway password key overwrites the current gateway password key. In step 1580, the messaging gateway 115 sends the formatted encrypted message over a wireless system.

Returning now to step 1508 of FIG. 12A, if there is no new device password key in the decrypted first message, then flow proceeds to step 1514. In step 1514, messaging gateway 115 determines if there is a new gateway password key embedded in the decrypted first message. If a new gateway password key is embedded in the decrypted first message, then flow proceeds to step 1516 in which the messaging gateway 115 parses the new gateway password key from the decrypted first message. In step 1518, messaging gateway 115 replaces the gateway password key stored in database 110 with a new gateway password key. Flow then proceeds to step 1540 of FIG. 12B. In step 1540, the flow is divided depending on the status of the next message handled by messaging gateway 115. If messaging gateway 115 receives a next message from wireless device 135, then flow proceeds to step 1542. In step 1542, messaging gateway 115 decrypts the next message received from wireless device 135 with the device password key. Note that in this case the device password key has not been changed. Flow then proceeds to step 1506 in which messaging gateway 115 searches the decrypted message for a new password key. In the step 1540, if messaging gateway 115 transmits the next message, then flow proceeds to step 1544. In step 1544, messaging gateway 115 determines whether a password key change is to be initiated. If in step 1544 a password key change is not initiated, then flow proceeds to step 1546 in which the messaging gateway 115 encrypts a message with the gateway password key. In this case, the gateway password key is the most recent gateway password key (the replaced gateway password key). In this case, the initial gateway password key stored in database 110 has been replaced with the new gateway password key of step 1516. It is this updated gateway password key that is used to encrypt the message in step 1546. In step 1538, this message is transmitted.

If in step 1544 messaging gateway 115 initiates a gateway password key change, then flow proceeds to step 1550 of FIG. 12C. Flow then proceeds as previously described. It should be noted that in steps 1558 and steps 1574 of FIG. 12C, the messaging gateway 115 encrypts the message using the gateway password key. In this case, the gateway password key has already been replaced once. It is this replaced gateway password key that is used to encrypt this next message in steps 1558 and 1574.

Returning now to step 1514, if there is not a new gateway password key contained in decrypted first message, then flow proceeds to step 1520. In step 1520, flow is divided based on the status of the next message handled by messaging gateway 115. If messaging gateway 115 receives the next message, then flow proceeds to step 1522 in which messaging gateway 115 decrypts this next message with the device password key. Flow then proceeds to step 1506 in which messaging gateway 115 searches the decrypted message for a new password key. If messaging gateway 115 transmits the next message, then flow proceeds from step 1520 to step 1524. In step 1524, messaging gateway 115 encrypts the message with the gateway password key. Flow then proceeds to step 1526 in which the encrypted message is transmitted.

Figure 13A:
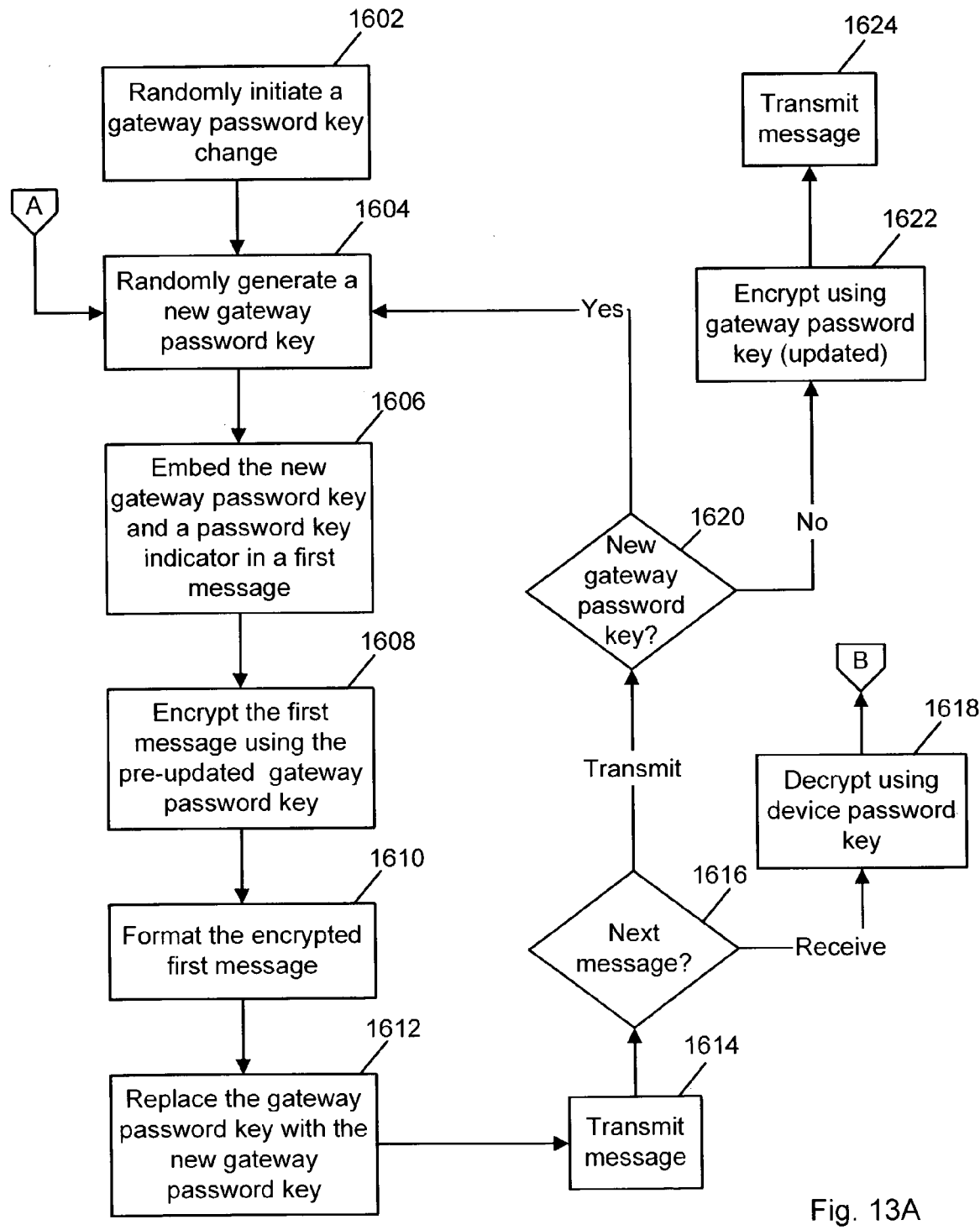
FIGS. 13A and 13B are a flowchart depicting the operation of a wireless communication system using two password keys consistent with the principles of the present invention.
Figure 13B:
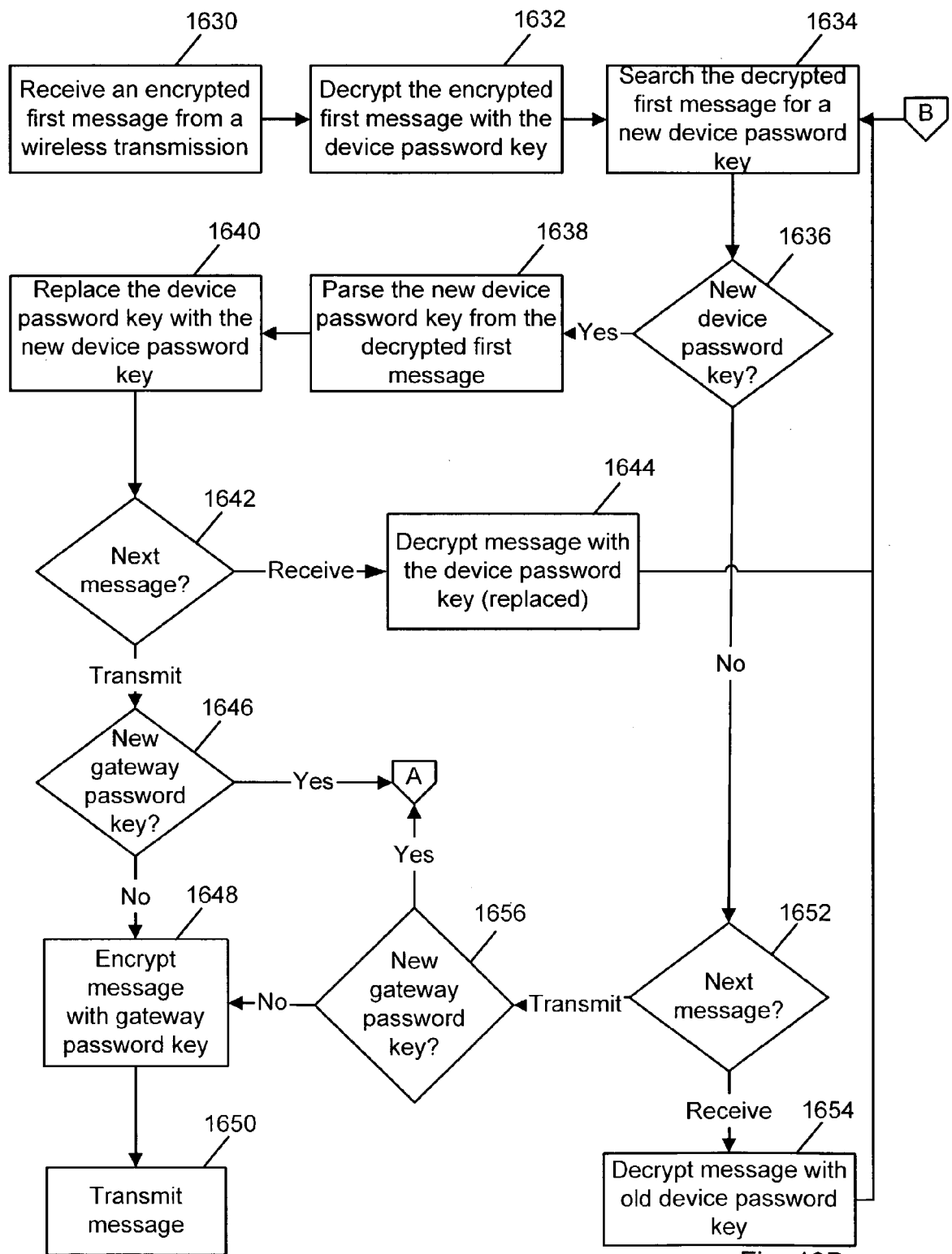

FIGS. 13A and 13B are a flow diagram of a synchronization method consistent with the principles of the present invention. In the synchronization method depicted in FIGS. 13A and 13B, two different password keys are used. As with the exemplary method of FIGS. 12A, 12B, and 12C the exemplary synchronization method of FIGS. 13A and 13B utilize two different password keys—a gateway password key and a device password key. In this embodiment, however, the gateway password key can only be changed by messaging gateway 115 while the device password key can only be changed by wireless device 135.

Referring now to FIG. 13A, wireless messaging gateway 115 randomly initiates a gateway password key change in step 1602. In step 1604, messaging gateway 115 randomly generates a new gateway password key. Alternatively, password generator 105 randomly generates the new gateway password key. In step 1606, messaging gateway 115 embeds the new gateway password key and a password key indicator or delimiter in a first message. In step 1608, messaging gateway 115 encrypts the first message using the pre-updated gateway password key. In this case, the pre-updated gateway password key is the gateway password key to which messaging gateway 115 and wireless device 135 have common access. In other words, the current gateway password key is used to encrypt the message containing the new or updated gateway password key.

In step 1610, messaging gateway 115 formats the encrypted first message. In step 1612, messaging gateway 115 replaces the gateway password key stored in database 110 with the new gateway password key. In step 1614, messaging gateway 115 transmits the message.

In step 1616, the flow depends on the status of the next message handled by messaging gateway 115. If messaging gateway 115 receives the next message, then flow proceeds to step 1618 in which messaging gateway 115 decrypts the next message using the device password key. The device password key is used because the next message originated with wireless device 135. Flow then proceeds to step 1634 of FIG. 13B. If in step 1616, messaging gateway 115 transmits the next message, then flow proceeds to step 1620. In step 1620, messaging gateway determines whether a new gateway password key is to be embedded in the next message. If a new gateway password key is to be embedded in the next message, then flow proceeds to step 1604 in which messaging gateway 115 or password generator 105 randomly generates a new gateway password key. If in step 1620 messaging gateway 115 does not initiate a new gateway password key change, then flow proceeds to step 1622. In step 1622, the next message is encrypted using the updated gateway password key. In this case, messaging gateway 115 transmits two messages consecutively. The first message contained a new gateway password key while the second message did not. This second message is encrypted using the updated gateway password key that was transmitted in the previous message. In this manner, the next message transmitted is encrypted with a gateway password key contained in the prior message transmitted. In step 1624, the encrypted next message is transmitted.

Referring now to FIG. 13B, messaging gateway 115 receives an encrypted first message from a wireless transmission in step 1630. In step 1630, messaging gateway 115 receives this encrypted first message from wireless device 135. In step 1632, messaging gateway 115 decrypts the encrypted first message with the device password key. In this case, since the wireless device 135 sent the encrypted message, the device password key is used to decrypt this encrypted message. In step 1634, messaging gateway 115 searches the decrypted first message for a new device password key. In this case, since the encrypted message originated from wireless device 135, it may contain a new device password key. As mentioned, in this exemplary method, only wireless device 135 can change the device password key.

In step 1636, messaging gateway 115 determines if a new device password key is contained in the decrypted first message. If a new device password key is contained in the decrypted first message, then flow proceeds to step 1638 in which messaging gateway 115 parses the new device password key from the decrypted first message. In step 1640, messaging gateway 115 replaces the device password key stored on database 110 with the new device password key. Flow then proceeds to step 1642. In step 1642, the flow is divided based on the next type of message messaging gateway 115 handles. If messaging gateway 115 receives a next message, then messaging gateway 115 decrypts the next message with the device password key (the recently replaced device password key). In step 1644, messaging gateway 115 uses the most recently updated device password key to decrypt the next message received from wireless device 135. Flow then proceeds to step 1634 in which messaging gateway 115 searches the decrypted first message for a new device password key.

In step 1642, if messaging gateway 115 transmits a next message, then flow proceeds to step 1646. In step 1646, if the next message that messaging gateway 115 transmits does not contain a new gateway password key, then flow proceeds to step 1648. In step 1648, messaging gateway 115 encrypts the next message with the gateway password key. In step 1650, messaging gateway 115 transmits this encrypted next message. If in step 1646, messaging gateway 115 determines that a new gateway password key change is to be implemented, then flow proceeds to step 1604 of FIG. 13A.

In step 1636, if the decrypted first message does not contain a new device password key, then flow proceeds to step 1652.

In this case, messaging gateway 115 has searched the decrypted first message received from wireless device 135 and has found that there is no new device password key contained in that message. In step 1652, the flow depends on the status of the next message handled by messaging gateway 115. If the next message is received by messaging gateway 115 from wireless device 135, then flow proceeds to step 1654 in which the messaging gateway 115 decrypts the next message with the device password key. Flow then proceeds to step 1634 in which messaging gateway 115 searches the decrypted message for a new device password key. In this sequence, messaging gateway 115 has received a first message from wireless device 135. That first message did not contain a new device password key. Messaging gateway 115 then received a second message from wireless device 135.

In step 1652, if messaging gateway 115 transmits the next message, then flow proceeds to step 1656. In step 1656, messaging gateway 115 determines whether a new gateway password key change is to occur. If in step 1656 messaging gateway 115 determines that a new gateway password key change is to occur, then flow proceeds to step 1604 of FIG. 13A. If in step 1656 messaging gateway 115 determines that a new gateway password key change does not occur, then flow proceeds to step 1648. In step 1648, messaging gateway 115 encrypts the next message with the gateway password key. This encrypted next message is then transmitted in step 1650.

The method flows of FIGS. 12A, 12B, and 12C as well as those of FIGS. 13A and 13B are taken from the point of view of messaging gateway 115. Analogous flows are readily ascertainable for wireless device 135. For example, in FIGS. 13A and 13B, one need only replace the word "device" with the word "gateway" and the word "gateway" with the word "device." In this manner, swapping the words "device" and "gateway" in FIGS. 13A and 13B yields a password key change method for wireless device 135.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of dynamically changing password keys in a secured wireless communication system, the method comprising:

initiating a password key change;

generating a new password key;

embedding, in an outgoing message comprising message text, the new password key and a password key indicator, wherein:

the outgoing message is sent between a wireless device and a network element of a wireless communications system; and the password key indicator is randomly placed at a first location within the message text of the outgoing message, the new password key following the password key indicator;

accessing a database comprising records of an old password key associated with the wireless device;

encrypting the outgoing message using the old password key;

storing the new password key associated with the wireless device on the database;

formatting the encrypted outgoing message; and sending the encrypted outgoing message over the wireless communications system using the new password key.

2. The method of claim 1 further comprising:
receiving a subsequent second message; and
decrypting the subsequent second message using the new password key.

3. The method of claim 2 further comprising:
encrypting a third message using the new password key; and
transmitting the encrypted third message on the wireless communications system.

4. The method of claim 1 wherein a password key change is initiated on a random basis.

5. The method of claim 1 wherein a password key change is initiated by a network element.

6. The method of claim 1 wherein a password key change is initiated by a wireless apparatus.

7. The method of claim 1 wherein the new password key is generated randomly.

8. The method of claim 1 further comprising:
receiving an encrypted second message from a wireless transmission;
decrypting the encrypted second message with the new password key;
determining that the new password key is incorrect based on the contents of the incorrectly decrypted second message; and
replacing the new password key with a prior password key.

9. The method of claim 1 further comprising:
receiving an encrypted second message;
decrypting the encrypted second message with the new password key;
determining that the new password key is incorrect based on the contents of the incorrectly decrypted second message;
decrypting the encrypted second message with a prior password key; and
replacing the new password key with the prior password key.

10. A method of dynamically changing password keys in a secured wireless communications system, the method comprising:
receiving an encrypted first message from a wireless transmission;
decrypting the encrypted first message with an old password key;
searching a message text portion of the decrypted first message for a new password key indicator, the message text portion comprising message text;
parsing a new password key from the message text portion, if the password key indicator is located, wherein the new password key is embedded in the message text portion following the new password key indicator, and wherein the new password key indicator is randomly placed at a location within the message text portion of the first message;
replacing the old password key with the new password key;
encrypting a subsequent second message using the new password key;
transmitting the encrypted subsequent second message on a wireless communications system;
receiving the encrypted subsequent second message;
decrypting the encrypted subsequent second message with the new password key;
determining that the new password key is incorrect based on the contents of the incorrectly decrypted subsequent second message; and
replacing the new password key with a prior password key.

11. The method of claim 10 further comprising:
decrypting the encrypted subsequent second message with a prior password key.

12. A method of dynamically changing password keys in a secured wireless communications system, the method comprising:
receiving an encrypted first message from a wireless transmission;
decrypting the encrypted first message with an old receive password;
searching a message text portion of the decrypted first message for a new password key indicator and parsing a new password key from the message text portion if a password key indicator is located, wherein the new password key indicator is randomly placed at a location within the message text portion, and wherein the new password key is embedded in the message text portion at a location following the new password key indicator;
replacing the old receive password key with the new password key, if the new password key is a new receive password key; and
replacing an old transmit password key with the new password key, if the new password key is a new transmit password key.

13. The method of claim 12 further comprising:
decrypting a second message using the new password key, if the new password key is a new receive password key; and
encrypting a second message using the new password key, if the new password key is a new transmit password key.

14. The method of claim 13 further comprising:
transmitting the encrypted second message on a wireless communications system.

15. The method of claim 12 further comprising:
receiving an encrypted second message from a wireless transmission;
decrypting the encrypted second message with the new password key;
determining that the new password key is incorrect based on the contents of the incorrectly decrypted second message; and
replacing the new password key with a prior password key.

16. The method of claim 12 further comprising:
receiving an encrypted second message;
decrypting the encrypted second message with the new password key;
determining that the new password key is incorrect based on the contents of the incorrectly decrypted second message;
decrypting the encrypted second message with a prior password key; and
replacing the new password key with the prior password key.

17. A method of dynamically changing password keys in a secured wireless communications system, the method comprising:
generating a new password key;
embedding the new password key and a password key indicator in a first message, the password key indicator being randomly placed at a first location within a message text portion of the first message, the new password key following the password key indicator;
encrypting the first message using an old transmit password key;
replacing the old receive password key with the new password key, if the new password key is a new receive password key;

sending the encrypted first message over a wireless communications system;

decrypting a second message using the new password key, if the new password key is a new receive password key; and encrypting a second message using the new password key, if the new password key is a new transmit password key.

18. The method of claim 17 further comprising:
initiating a password key change.

19. The method of claim 18 wherein a password key change is initiated on a random basis.

20. The method of claim 18 wherein a password key change is initiated by a network element.

21. The method of claim 18 wherein a password key change is initiated by a wireless apparatus.

22. The method of claim 17 wherein the new password key is generated randomly.

23. The method of claim 17 further comprising:
formatting the encrypted second message.

24. The method of claim 17 further comprising:
transmitting the encrypted second message on a wireless communications system.

25. The method of claim 17 further comprising:
receiving an encrypted second message from a wireless transmission;
determining that the new password key is incorrect based on the contents of the incorrectly decrypted second message; and
replacing the new password key with a prior password key.

26. The method of claim 17 further comprising:
receiving an encrypted second message;
decrypting the encrypted second message with the new password key;
determining that the new password key is incorrect based on the contents of the incorrectly decrypted second message;
decrypting the encrypted second message with a prior password key; and
replacing the new password key with the prior password key.

27. A password protected communications apparatus, the apparatus comprising:
an element for generating an updated password key;
an operating system configured for:
embedding the updated password key and an updated password key indicator in a first message; and
encrypting the first message using an old password key, the password key indicator being randomly placed at a first location within a message text portion of the first message, the new password key following the password key indicator; and
a memory for storing:
the updated password key, an initial password key, wireless device information, and communications information, the initial password key and the update password key being associated with the communication information and the wireless device information comprising an identification number for the wireless device and a plurality of password keys associated with the wireless device; and
a transmit password key and a receive password key, the transmit password key and the receive password key being associated with the communications information, wherein:
the operating system is further configured to:
replace an old transmit password key in the memory with the updated password key, if the updated password key is a new transmit password key; and
replace an old receive password key in the memory with the updated password key, if the updated password key is a new receive password key.

28. The apparatus of claim 27 further comprising:
an element for transmitting the encrypted first message over a wireless communications apparatus.

29. The apparatus of claim 27 wherein the operating system is further configured to decrypt a subsequent second message using the new password key.

30. The apparatus of claim 27 wherein the operating system is further configured to encrypt a third message using the new password key.

31. The apparatus of claim 27 wherein the operating system is further configured to format the encrypted first message.

32. The apparatus of claim 27 wherein the operating system is further configured to initiate a password key change.

33. The apparatus of claim 27 wherein the element for generating an updated password key is a random number generator.

34. A password protected communications apparatus, the apparatus comprising:
an operating system for:
receiving an encrypted first message from a wireless transmission, the first message comprising message text, a new password key and a password key indicator;
decrypting the encrypted first message with an old password key;
searching the message text portion of the decrypted first message for a the new password key indicator; and
parsing the new password key from the message text portion if the password key indicator is located;
replacing an old receive password key in the memory with the new password key, if the new password key is a new receive password key; and
replacing an old transmit password key in the memory with the new password key, if the new password key is a new transmit password key;
decrypting a second message using the new password key, if the new password key is a new receive password key; and
encrypting a second message using the new password key, if the new password key is a new transmit password key; and
a memory for storing the new password key, an initial password key, and communications information, the initial password key and the new password key associated with the communications information.

35. The apparatus of claim 34 further comprising:
an element for transmitting the encrypted subsequent second message on a wireless communications apparatus.

36. The method of claim 1 further comprising:
generating a second new password key;
embedding the second new password key and a second password key indicator in a second message, the second password key indicator being placed at a second location within a message text portion of the second message, the second new password key following the password key indicator in the second message, the second location differing from the first location;
encrypting the second message using the first new password key;
storing the second new password key; and
sending the encrypted second message over the wireless communications system.

* * * * *